(12) United States Patent
Lee et al.

(10) Patent No.: US 11,737,087 B2
(45) Date of Patent: Aug. 22, 2023

(54) METHOD AND APPARATUS FOR TRANSMITTING/RECEIVING WIRELESS SIGNAL IN WIRELESS COMMUNICATION SYSTEM

(71) Applicant: LG ELECTRONICS INC., Seoul (KR)

(72) Inventors: Youngdae Lee, Seoul (KR); Jaehyung Kim, Seoul (KR); Seunggye Hwang, Seoul (KR); Suckchel Yang, Seoul (KR); Seonwook Kim, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 98 days.

(21) Appl. No.: 17/508,491

(22) Filed: Oct. 22, 2021

(65) Prior Publication Data

US 2022/0132546 A1    Apr. 28, 2022

(30) Foreign Application Priority Data

Oct. 22, 2020    (KR) .......................... 10-2020-0137458

(51) Int. Cl.
*H04W 72/12*      (2023.01)
*H04W 72/1273*    (2023.01)
*H04W 68/00*      (2009.01)
*H04L 5/00*       (2006.01)
*H04W 72/044*     (2023.01)
*H04W 72/23*      (2023.01)
*H04W 72/51*      (2023.01)

(52) U.S. Cl.
CPC ....... *H04W 72/1273* (2013.01); *H04L 5/0012* (2013.01); *H04W 68/005* (2013.01); *H04W 72/044* (2013.01); *H04W 72/23* (2023.01); *H04W 72/51* (2023.01)

(58) Field of Classification Search
None
See application file for complete search history.

(56) References Cited

FOREIGN PATENT DOCUMENTS

| CN | 110012524 A | * | 7/2019 | .......... H04J 13/0029 |
| CN | 113316236 A | * | 8/2021 | ........ H04W 52/0248 |
| WO | WO-2021217488 A1 | * | 11/2021 | |

* cited by examiner

*Primary Examiner* — Alex Skripnikov
(74) *Attorney, Agent, or Firm* — Bryan Cave Leighton, Paisner LLP

(57) ABSTRACT

Various embodiments of the present disclosure relate to a next-generation wireless communication system for supporting high data transfer rates beyond the 4th generation (4G) wireless communication system. According to the various embodiments, a method of transmitting and receiving signals in a wireless communication system and apparatus for supporting the same may be provided.

15 Claims, 16 Drawing Sheets

FIG. 9

METHOD AND APPARATUS FOR TRANSMITTING/RECEIVING WIRELESS SIGNAL IN WIRELESS COMMUNICATION SYSTEM

CROSS-REFERENCE TO RELATED APPLICATIONS

This application claims the benefit of KR Application No. 10-2020-0137458 filed on Oct. 22, 2020 which is hereby incorporated by reference as if fully set forth herein.

TECHNICAL FIELD

The present disclosure relates to a wireless communication system, and more particularly, to a method and apparatus for transmitting/receiving a wireless signal.

BACKGROUND

Generally, a wireless communication system is developing to diversely cover a wide range to provide such a communication service as an audio communication service, a data communication service and the like. The wireless communication is a sort of a multiple access system capable of supporting communications with multiple users by sharing available system resources (e.g., bandwidth, transmit power, etc.). For example, the multiple access system may be any of a code division multiple access (CDMA) system, a frequency division multiple access (FDMA) system, a time division multiple access (TDMA) system, an orthogonal frequency division multiple access (OFDMA) system, and a single carrier frequency division multiple access (SC-FDMA) system.

SUMMARY

An object of the present disclosure is to provide a method of efficiently performing wireless signal transmission/reception procedures and an apparatus therefor.

It will be appreciated by persons skilled in the art that the objects and advantages that could be achieved with the present disclosure are not limited to what has been particularly described hereinabove and the above and other objects and advantages that the present disclosure could achieve will be more clearly understood from the following detailed description.

According to an embodiment of the present disclosure, a method of transmitting and receiving signals by a user equipment (UE) in a wireless communication system is provided. The method may include: transmitting information on a paging capability of the UE to a base station; receiving downlink control information (DCI) including either or both scheduling information on a first physical downlink shared channel (PDSCH) and scheduling information on a second PDSCH based on the paging capability; receiving the first PDSCH for paging based on the DCI; and receiving the second PDSCH for paging based on the DCI based on the DCI including the scheduling information on the second PDSCH. In this case, a first bit field of the DCI may include the scheduling information for transmission of the first PDSCH, and a second bit field of the DCI may include the scheduling information for transmission of the second PDSCH.

The DCI may include an indicator indicating whether a first transport block (TB) included in the first PDSCH is different from a second TB included in the second PDSCH.

The method may further include obtaining, by the UE, a paging message by performing soft combining and decoding on the first TB and the second TB based on the indicator indicating that the first TB is equal to the second TB.

The method may further include obtaining a paging message by decoding the second TB based on the indicator indicating that the first TB is different from the second TB.

The scheduling information for the transmission of the second PDSCH may include at least one of an identifier (ID) of a bandwidth part (BWP) in which the second PDSCH is transmitted, a frequency hopping pattern for the transmission of the second PDSCH, or information on allocation of resources on which the second PDSCH is transmitted.

The resource allocation information on the second PDSCH may include either or both frequency resources of the second PDSCH and a time gap between the second PDSCH and the DCI.

The method may further include skipping the reception of the second PDSCH based on the time gap between the second PDSCH and the DCI equal to 0

The second PDSCH may be received in the BWP indicated by the ID of the BWP.

The information on the paging capability may include information on a type of UE to receive the second PDSCH and information on specific UEs to receive the second PDSCH.

The type of UE to receive the second PDSCH may include a UE having reduced capabilities and incapable of supporting some or all of conventional UE capabilities or a UE requiring cell coverage enhancement.

A nonvolatile computer-readable medium having recorded thereon a program code for executing the method may be provided.

According an embodiment of the present disclosure, a UE operating in a wireless communication system is provided. The UE may include: a transceiver; and one or more processors connected to the transceiver.

The transceiver may be configured to: transmit information on a paging capability of the UE to a base station; receive DCI including either or both scheduling information on a first PDSCH and scheduling information on a second PDSCH based on the paging capability; receive the first PDSCH for paging based on the DCI; and receive the second PDSCH for paging based on the DCI based on the DCI including the scheduling information on the second PDSCH. In this case, a first bit field of the DCI may include the scheduling information for transmission of the first PDSCH, and a second bit field of the DCI may include the scheduling information for transmission of the second PDSCH.

The DCI may include an indicator indicating whether a first TB included in the first PDSCH is different from a second TB included in the second PDSCH.

The one or more processors may be configured to obtain a paging message by performing soft combining and decoding on the first TB and the second TB based on the indicator indicating that the first TB is equal to the second TB.

The scheduling information for the transmission of the second PDSCH may include at least one of an ID of a BWP in which the second PDSCH is transmitted, a frequency hopping pattern for the transmission of the second PDSCH, or information on allocation of resources on which the second PDSCH is transmitted.

According to other aspect of the present disclosure, a non-transitory computer readable medium recorded thereon program codes for performing the aforementioned method is presented.

According to another aspect of the present disclosure, the UE configured to perform the aforementioned method is presented.

According to another aspect of the present disclosure, a device configured to control the UE to perform the aforementioned method is presented.

BRIEF DESCRIPTION OF THE DRAWINGS

FIG. 9 illustrates an example of a RACH occasion defined in one RACH slot in the NR system;

DETAILED DESCRIPTION

Figure 1:
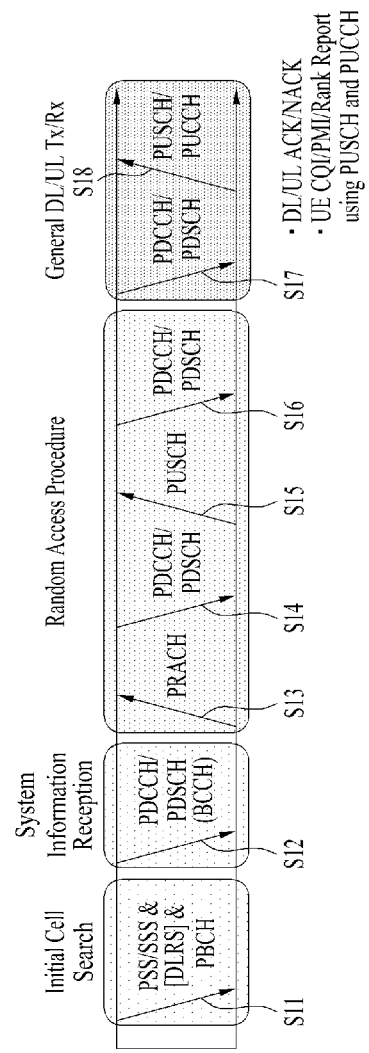
FIG. 1 illustrates physical channels used in a 3rd generation partnership project (3GPP) system, which is an example of wireless communication systems, and a general signal transmission method using the same.

Embodiments of the present disclosure are applicable to a variety of wireless access technologies such as code division multiple access (CDMA), frequency division multiple access (OFDMA), time division multiple access (TDMA), orthogonal frequency division multiple access (OFDMA), and single carrier frequency division multiple access (SC-FDMA). CDMA can be implemented as a radio technology such as Universal Terrestrial Radio Access (UTRA) or CDMA2000. TDMA can be implemented as a radio technology such as Global System for Mobile communications (GSM)/General Packet Radio Service (GPRS)/Enhanced Data Rates for GSM Evolution (EDGE). OFDMA can be implemented as a radio technology such as Institute of Electrical and Electronics Engineers (IEEE) 802.11 (Wireless Fidelity (Wi-Fi)), IEEE 802.16 (Worldwide interoperability for Microwave Access (WiMAX)), IEEE 802.20, and Evolved UTRA (E-UTRA). UTRA is a part of Universal Mobile Telecommunications System (UMTS). 3rd Generation Partnership Project (3GPP) Long Term Evolution (LTE) is part of Evolved UMTS (E-UMTS) using E-UTRA, and LTE-Advanced (A) is an evolved version of 3GPP LTE. 3GPP NR (New Radio or New Radio Access Technology) is an evolved version of 3GPP LTE/LTE-A.

As more and more communication devices require a larger communication capacity, there is a need for mobile broadband communication enhanced over conventional radio access technology (RAT). In addition, massive Machine Type Communications (MTC) capable of providing a variety of services anywhere and anytime by connecting multiple devices and objects is another important issue to be considered for next generation communications. Communication system design considering services/UEs sensitive to reliability and latency is also under discussion. As such, introduction of new radio access technology considering enhanced mobile broadband communication (eMBB), massive MTC, and Ultra-Reliable and Low Latency Communication (URLLC) is being discussed. In the present disclosure, for simplicity, this technology will be referred to as NR (New Radio or New RAT).

For the sake of clarity, 3GPP NR is mainly described, but the technical idea of the present disclosure is not limited thereto.

Details of the background, terminology, abbreviations, etc. used herein may be found in 3GPP standard documents published before the present disclosure.

Following documents are incorporated by reference:

3GPP LTE

TS 36.211: Physical channels and modulation

TS 36.212: Multiplexing and channel coding

TS 36.213: Physical layer procedures

TS 36.300: Overall description

TS 36.321: Medium Access Control (MAC)

TS 36.331: Radio Resource Control (RRC)

3GPP NR

TS 38.211: Physical channels and modulation

TS 38.212: Multiplexing and channel coding

TS 38.213: Physical layer procedures for control

TS 38.214: Physical layer procedures for data

TS 38.300: NR and NG-RAN Overall Description

TS 38.321: Medium Access Control (MAC)

TS 38.331: Radio Resource Control (RRC) protocol specification

Abbreviations and Terms

PDCCH: Physical Downlink Control CHannel

PDSCH: Physical Downlink Shared CHannel

PUSCH: Physical Uplink Shared CHannel

CSI: Channel state information

RRM: Radio resource management

RLM: Radio link monitoring

DCI: Downlink Control Information

CAP: Channel Access Procedure

Ucell: Unlicensed cell

PCell: Primary Cell

PSCell: Primary SCG Cell

TBS: Transport Block Size

SLIV: Starting and Length Indicator Value

BWP: BandWidth Part

CORESET: COntrol REsourse SET

REG: Resource element group

SFI: Slot Format Indicator

COT: Channel occupancy time

SPS: Semi-persistent scheduling

PLMN ID: Public Land Mobile Network identifier

RACH: Random Access Channel

RAR: Random Access Response

Msg3: Message transmitted on UL-SCH containing a C-RNTI MAC CE or CCCH SDU, submitted from upper layer and associated with the UE Contention Resolution Identity, as part of a Random Access procedure.

Special Cell: For Dual Connectivity operation the term Special Cell refers to the PCell of the MCG or the PSCell of the SCG depending on if the MAC entity is associated to the MCG or the SCG, respectively. Otherwise the term Special Cell refers to the PCell. A Special Cell supports PUCCH transmission and contention-based Random Access, and is always activated.

Serving Cell: A PCell, a PSCell, or an SCell

In a wireless communication system, a user equipment (UE) receives information through downlink (DL) from a base station (BS) and transmit information to the BS through uplink (UL). The information transmitted and received by the BS and the UE includes data and various control information and includes various physical channels according to type/usage of the information transmitted and received by the UE and the BS.

FIG. 1 illustrates physical channels used in a 3GPP NR system and a general signal transmission method using the same.

When a UE is powered on again from a power-off state or enters a new cell, the UE performs an initial cell search procedure, such as establishment of synchronization with a BS, in step S101. To this end, the UE receives a synchronization signal block (SSB) from the BS. The SSB includes a primary synchronization signal (PSS), a secondary synchronization signal (SSS), and a physical broadcast channel (PBCH). The UE establishes synchronization with the BS based on the PSS/SSS and acquires information such as a cell identity (ID). The UE may acquire broadcast information in a cell based on the PBCH. The UE may receive a DL reference signal (RS) in an initial cell search procedure to monitor a DL channel status.

After initial cell search, the UE may acquire more specific system information by receiving a physical downlink control channel (PDCCH) and receiving a physical downlink shared channel (PDSCH) based on information of the PDCCH in step S102.

The UE may perform a random access procedure to access the BS in steps S103 to S106. For random access, the UE may transmit a preamble to the BS on a physical random access channel (PRACH) (S103) and receive a response message for preamble on a PDCCH and a PDSCH corresponding to the PDCCH (S104). In the case of contention-based random access, the UE may perform a contention resolution procedure by further transmitting the PRACH (S105) and receiving a PDCCH and a PDSCH corresponding to the PDCCH (S106).

After the foregoing procedure, the UE may receive a PDCCH/PDSCH (S107) and transmit a physical uplink shared channel (PUSCH)/physical uplink control channel (PUCCH) (S108), as a general downlink/uplink signal transmission procedure. Control information transmitted from the UE to the BS is referred to as uplink control information (UCI). The UCI includes hybrid automatic repeat and request acknowledgement/negative-acknowledgement (HARQ-ACK/NACK), scheduling request (SR), channel state information (CSI), etc. The CSI includes a channel quality indicator (CQI), a precoding matrix indicator (PMI), a rank indicator (RI), etc. While the UCI is transmitted on a PUCCH in general, the UCI may be transmitted on a PUSCH when control information and traffic data need to be simultaneously transmitted. In addition, the UCI may be aperiodically transmitted through a PUSCH according to request/command of a network.

Figure 2:
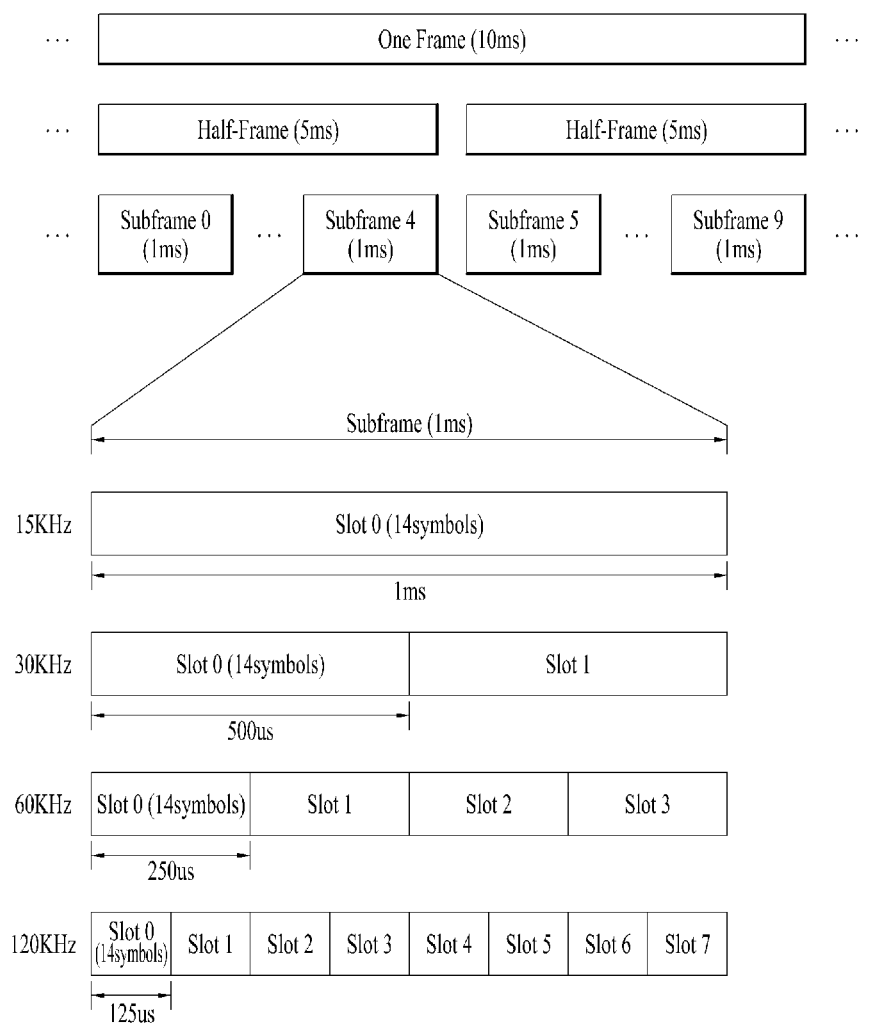
FIG. 2 illustrates a radio frame structure.

FIG. 2 illustrates a radio frame structure. In NR, uplink and downlink transmissions are configured with frames. Each radio frame has a length of 10 ms and is divided into two 5-ms half-frames (HF). Each half-frame is divided into five 1-ms subframes (SFs). A subframe is divided into one or more slots, and the number of slots in a subframe depends on subcarrier spacing (SCS). Each slot includes 12 or 14 Orthogonal Frequency Division Multiplexing (OFDM) symbols according to a cyclic prefix (CP). When a normal CP is used, each slot includes 14 OFDM symbols. When an extended CP is used, each slot includes 12 OFDM symbols.

Table 1 exemplarily shows that the number of symbols per slot, the number of slots per frame, and the number of slots per subframe vary according to the SCS when the normal CP is used.

TABLE 1

| SCS ($15*2^u$) | $N^{slot}_{symb}$ | $N^{frame,u}_{slot}$ | $N^{subframe,u}_{slot}$ |
|---|---|---|---|
| 15 KHz (u = 0) | 14 | 10 | 1 |
| 30 KHz (u = 1) | 14 | 20 | 2 |
| 60 KHz (u = 2) | 14 | 40 | 4 |
| 120 KHz (u = 3) | 14 | 80 | 8 |
| 240 KHz (u = 4) | 14 | 160 | 16 |

* $N^{slot}_{symb}$: Number of symbols in a slot
* $N^{frame,u}_{slot}$: Number of slots in a frame
* $N^{subframe,u}_{slot}$: Number of slots in a subframe Table 2 illustrates that the number of symbols per slot, the number of slots per frame, and the number of slots per subframe vary according to the SCS when the extended CP is used.

TABLE 2

| SCS ($15*2^u$) | $N^{slot}_{symb}$ | $N^{frame,u}_{slot}$ | $N^{subframe,u}_{slot}$ |
|---|---|---|---|
| 60 KHz (u = 2) | 12 | 40 | 4 |

The structure of the frame is merely an example. The number of subframes, the number of slots, and the number of symbols in a frame may vary.

In the NR system, OFDM numerology (e.g., SCS) may be configured differently for a plurality of cells aggregated for one UE. Accordingly, the (absolute time) duration of a time resource (e.g., an SF, a slot or a TTI) (for simplicity, referred to as a time unit (TU)) consisting of the same number of symbols may be configured differently among the aggregated cells. Here, the symbols may include an OFDM symbol (or a CP-OFDM symbol) and an SC-FDMA symbol (or a discrete Fourier transform-spread-OFDM (DFT-s-OFDM) symbol).

Figure 3:
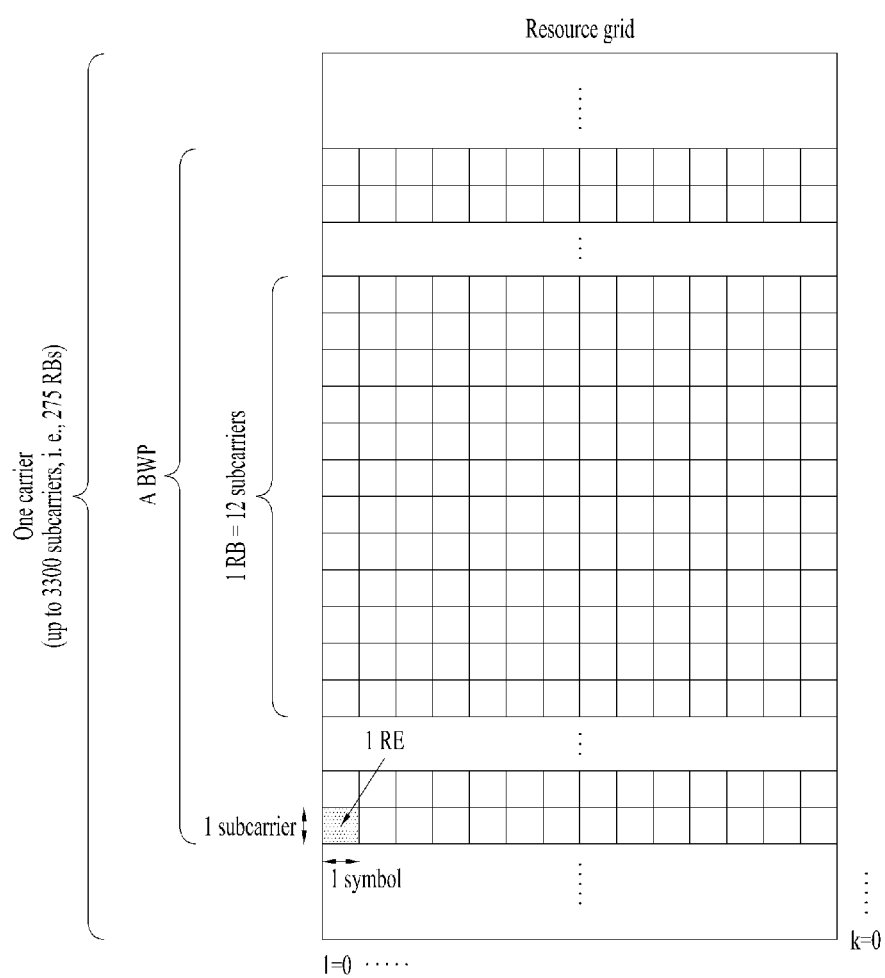
FIG. 3 illustrates a resource grid of a slot.

FIG. 3 illustrates a resource grid of a slot. A slot includes a plurality of symbols in the time domain. For example, when the normal CP is used, the slot includes 14 symbols. However, when the extended CP is used, the slot includes 12 symbols. A carrier includes a plurality of subcarriers in the frequency domain. A resource block (RB) is defined as a plurality of consecutive subcarriers (e.g., 12 consecutive subcarriers) in the frequency domain. A bandwidth part (BWP) may be defined to be a plurality of consecutive physical RBs (PRBs) in the frequency domain and correspond to a single numerology (e.g., SCS, CP length, etc.). The carrier may include up to N (e.g., 5) BWPs. Data communication may be performed through an activated BWP, and only one BWP may be activated for one UE. In the resource grid, each element is referred to as a resource element (RE), and one complex symbol may be mapped to each RE.

Figure 4:
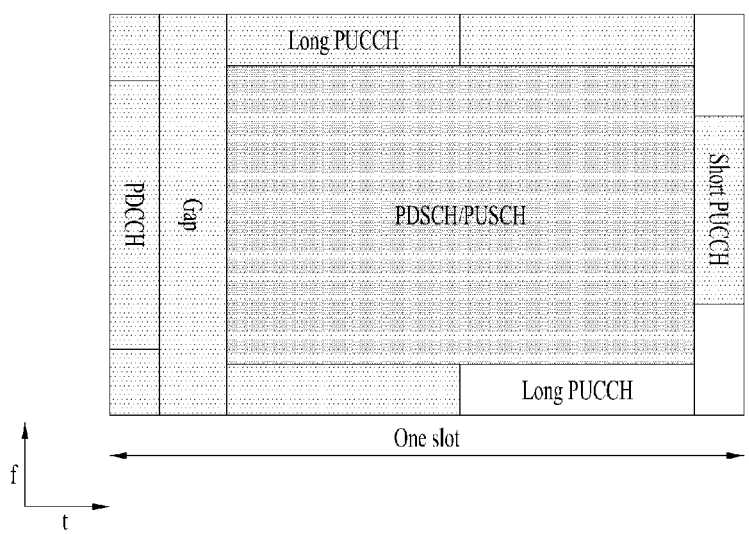
FIG. 4 illustrates exemplary mapping of physical channels in a slot.

FIG. 4 illustrates exemplary mapping of physical channels in a slot. In the NR system, a DL control channel, DL or UL data, and a UL control channel may be included in one slot. For example, the first N symbols (hereinafter, referred to as a DL control region) of a slot may be used to transmit a DL control channel (e.g., PDCCH), and the last M symbols (hereinafter, referred to as a UL control region) of the slot may be used to transmit a UL control channel (e.g., PUCCH). Each of N and M is an integer equal to or larger than 0. A resource region (hereinafter, referred to as a data region) between the DL control region and the UL control region may be used to transmit DL data (e.g., PDSCH) or UL data (e.g., PUSCH). A guard period (GP) provides a time gap for transmission mode-to-reception mode switching or reception mode-to-transmission mode switching at a BS and a UE. Some symbol at the time of DL-to-UL switching in a subframe may be configured as a GP.

The PDCCH delivers DCI. For example, the PDCCH (i.e., DCI) may carry information about a transport format and resource allocation of a DL shared channel (DL-SCH), resource allocation information of an uplink shared channel (UL-SCH), paging information on a paging channel (PCH), system information on the DL-SCH, information on resource allocation of a higher-layer control message such as an RAR transmitted on a PDSCH, a transmit power control command, information about activation/release of configured scheduling, and so on. The DCI includes a cyclic redundancy check (CRC). The CRC is masked with various identifiers (IDs) (e.g. a radio network temporary identifier (RNTI)) according to an owner or usage of the PDCCH. For example, if the PDCCH is for a specific UE, the CRC is masked by a UE ID (e.g., cell-RNTI (C-RNTI)). If the PDCCH is for a paging message, the CRC is masked by a paging-RNTI (P-RNTI). If the PDCCH is for system information (e.g., a system information block (SIB)), the CRC is masked by a system information RNTI (SI-RNTI). When the PDCCH is for an RAR, the CRC is masked by a random access-RNTI (RA-RNTI).

Figure 5:
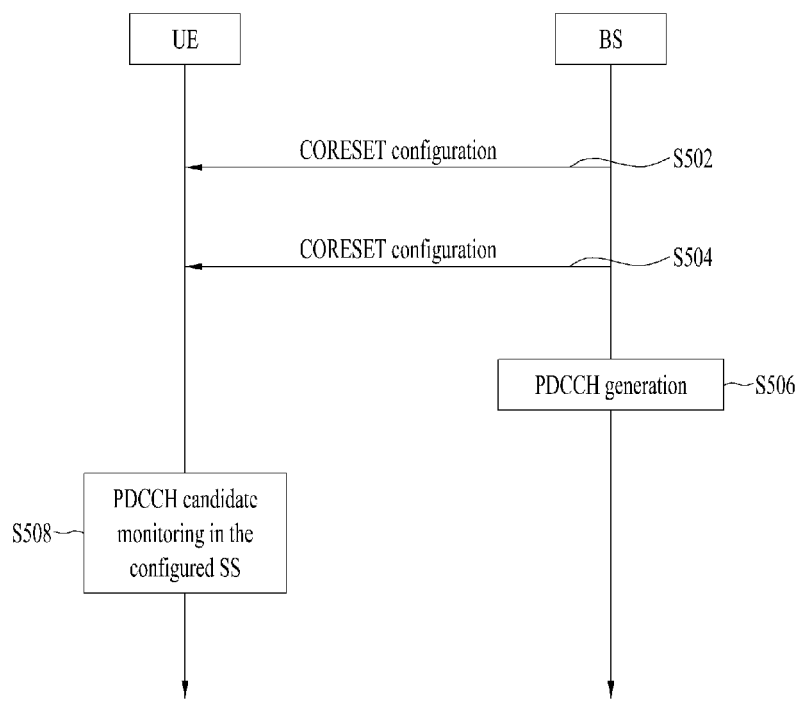
FIG. 5 is a diagram illustrating a signal flow for a physical downlink control channel (PDCCH) transmission and reception process.

FIG. 5 is a diagram illustrating a signal flow for a PDCCH transmission and reception process.

Referring to FIG. 5, a BS may transmit a control resource set (CORESET) configuration to a UE (S502). A CORSET is defined as a resource element group (REG) set having a given numerology (e.g., an SCS, a CP length, and so on). An REG is defined as one OFDM symbol by one (P)RB. A plurality of CORESETs for one UE may overlap with each other in the time/frequency domain. A CORSET may be configured by system information (e.g., a master information block (MIB)) or higher-layer signaling (e.g., radio resource control (RRC) signaling). For example, configuration information about a specific common CORSET (e.g., CORESET #0) may be transmitted in an MIB. For example, a PDSCH carrying system information block 1 (SIB1) may be scheduled by a specific PDCCH, and CORSET #0 may be used to carry the specific PDCCH. Configuration information about CORESET #N (e.g., N>0) may be transmitted by RRC signaling (e.g., cell-common RRC signaling or UE-specific RRC signaling). For example, the UE-specific RRC signaling carrying the CORSET configuration information may include various types of signaling such as an RRC setup message, an RRC reconfiguration message, and/or BWP configuration information. Specifically, a CORSET configuration may include the following information/fields.
  controlResourceSetId: indicates the ID of a CORESET.
  frequencyDomainResources: indicates the frequency resources of the CORESET. The frequency resources of the CORESET are indicated by a bitmap in which each bit corresponds to an RBG (e.g., six (consecutive) RBs). For example, the most significant bit (MSB) of the bitmap corresponds to a first RBG. RBGs corresponding to bits set to 1 are allocated as the frequency resources of the CORESET.
  duration: indicates the time resources of the CORESET. Duration indicates the number of consecutive OFDM symbols included in the CORESET. Duration has a value of 1 to 3.
  cce-REG-MappingType: indicates a control channel element (CCE)-REG mapping type. Interleaved and non-interleaved types are supported.
  interleaverSize: indicates an interleaver size.
  pdcch-DMRS-ScramblingID: indicates a value used for PDCCH DMRS initialization. When pdcch-DMRS-ScramblingID is not included, the physical cell ID of a serving cell is used.
  precoderGranularity: indicates a precoder granularity in the frequency domain.
  reg-BundleSize: indicates an REG bundle size.
  tci-PresentInDCI: indicates whether a transmission configuration index (TCI) field is included in DL-related DCI.
  tci-StatesPDCCH-ToAddList: indicates a subset of TCI states configured in pdcch-Config, used for providing quasi-co-location (QCL) relationships between DL RS(s) in an RS set (TCI-State) and PDCCH DMRS ports.

Further, the BS may transmit a PDCCH search space (SS) configuration to the UE (S504). The PDCCH SS configuration may be transmitted by higher-layer signaling (e.g., RRC signaling). For example, the RRC signaling may include, but not limited to, various types of signaling such as an RRC setup message, an RRC reconfiguration message, and/or BWP configuration information. While a CORESET configuration and a PDCCH SS configuration are shown in FIG. 5 as separately signaled, for convenience of description, the present disclosure is not limited thereto. For example, the CORESET configuration and the PDCCH SS configuration may be transmitted in one message (e.g., by one RRC signaling) or separately in different messages.

The PDCCH SS configuration may include information about the configuration of a PDCCH SS set. The PDCCH SS set may be defined as a set of PDCCH candidates monitored (e.g., blind-detected) by the UE. One or more SS sets may be configured for the UE. Each SS set may be a USS set or a CSS set. For convenience, PDCCH SS set may be referred to as "SS" or "PDCCH SS".

A PDCCH SS set includes PDCCH candidates. A PDCCH candidate is CCE(s) that the UE monitors to receive/detect a PDCCH. The monitoring includes blind decoding (BD) of PDCCH candidates. One PDCCH (candidate) includes 1, 2, 4, 8, or 16 CCEs according to an aggregation level (AL). One CCE includes 6 REGs. Each CORESET configuration is associated with one or more SSs, and each SS is associated with one CORESET configuration. One SS is defined based on one SS configuration, and the SS configuration may include the following information/fields.
  searchSpaceId: indicates the ID of an SS.
  controlResourceSetId: indicates a CORESET associated with the SS.
  monitoringSlotPeriodicityAndOffset: indicates a periodicity (in slots) and offset (in slots) for PDCCH monitoring.
  monitoringSymbolsWithinSlot: indicates the first OFDM symbol(s) for PDCCH monitoring in a slot configured with PDCCH monitoring. The first OFDM symbol(s) for PDCCH monitoring is indicated by a bitmap with each bit corresponding to an OFDM symbol in the slot. The MSB of the bitmap corresponds to the first OFDM symbol of the slot. OFDM symbol(s) corresponding to bit(s) set to 1 corresponds to the first symbol(s) of a CORESET in the slot.

nrofCandidates: indicates the number of PDCCH candidates (one of values 0, 1, 2, 3, 4, 5, 6, and 8) for each AL where AL={1, 2, 4, 8, 16}.

searchSpaceType: indicates common search space (CSS) or UE-specific search space (USS) as well as a DCI format used in the corresponding SS type.

Subsequently, the BS may generate a PDCCH and transmit the PDCCH to the UE (S506), and the UE may monitor PDCCH candidates in one or more SSs to receive/detect the PDCCH (S508). An occasion (e.g., time/frequency resources) in which the UE is to monitor PDCCH candidates is defined as a PDCCH (monitoring) occasion. One or more PDCCH (monitoring) occasions may be configured in a slot.

Table 3 shows the characteristics of each SS.

TABLE 3

| Type | Search Space | RNTI | Use Case |
|---|---|---|---|
| Type0-PDCCH | Common | SI-RNTI on a primary cell | SIB Decoding |
| Type0A-PDCCH | Common | SI-RNTI on a primary cell | SIB Decoding |
| Type1-PDCCH | Common | RA-RNTI or TC-RNTI on a primary cell | Msg2, Msg4 decoding in RACH |
| Type2-PDCCH | Common | P-RNTI on a primary cell | Paging Decoding |
| Type3-PDCCH | Common | INT-RNTI, SFI-RNTI, TPC-PUSCH-RNTI, TPC-PUCCH-RNTI, TPC-SRS-RNTI, C-RNTI, MCS-C-RNTI, or CS-RNTI(s) | |
| | UE Specific | C-RNTI, or MCS-C-RNTI, or CS-RNTI(s) | User specific PDSCH decoding |

Table 4 shows DCI formats transmitted on the PDCCH.

TABLE 4

| DCI format | Usage |
|---|---|
| 0_0 | Scheduling of PUSCH in one cell |
| 0_1 | Scheduling of PUSCH in one cell |
| 1_0 | Scheduling of PDSCH in one cell |
| 1_1 | Scheduling of PDSCH in one cell |
| 2_0 | Notifying a group of UEs of the slot format |
| 2_1 | Notifying a group of UEs of the PRB(s) and OFDM symbol(s) where UE may assume no transmission is intended for the UE |
| 2_2 | Transmission of TPC commands for PUCCH and PUSCH |
| 2_3 | Transmission of a group of TPC commands for SRS transmissions by one or more UEs |

DCI format 0_0 may be used to schedule a TB-based (or TB-level) PUSCH, and DCI format 0_1 may be used to schedule a TB-based (or TB-level) PUSCH or a code block group (CBG)-based (or CBG-level) PUSCH. DCI format 1_0 may be used to schedule a TB-based (or TB-level) PDSCH, and DCI format 1_1 may be used to schedule a TB-based (or TB-level) PDSCH or a CBG-based (or CBG-level) PDSCH (DL grant DCI). DCI format 0_0/0_1 may be referred to as UL grant DCI or UL scheduling information, and DCI format 1_0/1_1 may be referred to as DL grant DCI or DL scheduling information. DCI format 2_0 is used to deliver dynamic slot format information (e.g., a dynamic slot format indicator (SFI)) to a UE, and DCI format 2_1 is used to deliver DL pre-emption information to a UE. DCI format 2_0 and/or DCI format 2_1 may be delivered to a corresponding group of UEs on a group common PDCCH which is a PDCCH directed to a group of UEs.

DCI format 0_0 and DCI format 1_0 may be referred to as fallback DCI formats, whereas DCI format 0_1 and DCI format 1_1 may be referred to as non-fallback DCI formats. In the fallback DCI formats, a DCI size/field configuration is maintained to be the same irrespective of a UE configuration. In contrast, the DCI size/field configuration varies depending on a UE configuration in the non-fallback DCI formats.

A CCE-to-REG mapping type is set to one of an interleaved type and a non-interleaved type.

Non-interleaved CCE-to-REG mapping (or localized CCE-to-REG mapping): 6 REGs for a given CCE are grouped into one REG bundle, and all of the REGs for the given CCE are contiguous. One REG bundle corresponds to one CCE.

Interleaved CCE-to-REG mapping (or distributed CCE-to-REG mapping): 2, 3 or 6 REGs for a given CCE are grouped into one REG bundle, and the REG bundle is interleaved within a CORESET. In a CORESET including one or two OFDM symbols, an REG bundle includes 2 or 6 REGs, and in a CORESET including three OFDM symbols, an REG bundle includes 3 or 6 REGs. An REG bundle size is configured on a CORESET basis.

System Information Acquisition

A UE may acquire AS-/NAS-information in the SI acquisition process. The SI acquisition process may be applied to UEs in RRC_IDLE state, RRC_INACTIVE state, and RRC_CONNECTED state.

SI is divided into a master information block (MIB) and a plurality of system information blocks (SIBs). The SI except for the MIB may be referred to as remaining minimum system information (RMS) and other system information (OSI). RMSI corresponds to SIB1, and OSI refers to SIBs of SIB2 or higher other than SIB1. For details, reference may be made to the followings.

The MIB includes information/parameters related to reception of systemInformaitonBlockType1 (SIB1) and is transmitted on a PBCH of an SSB. MIB information may include the following fields.

pdcch-ConfigSIB1: Determines a common ControlResourceSet (CORESET), a common search space and necessary PDCCH parameters. If the field ssb-SubcarrierOffset indicates that SIB1 is absent, the field pdcch-ConfigSIB1 indicates the frequency positions where the UE may find SS/PBCH block with SIB1 or the frequency range where the network does not provide SS/PBCH block with SIB1.

ssb-SubcarrierOffset: Corresponds to kSSB which is the frequency domain offset between SSB and the overall resource block grid in number of subcarriers. The value range of this field may be extended by an additional most significant bit encoded within PBCH. This field may indicate that this cell does not provide SIB1 and that there is hence no CORESET #0 configured in MIB. In this case, the field pdcch-ConfigSIB1 may indicate the frequency positions where the UE may (not) find a SS/PBCH with a control resource set and search space for SIB1.

subCarrierSpacingCommon: Subcarrier spacing for SIB1, Msg.2/4 for initial access, paging and broadcast SI-messages. If the UE acquires this MIB on an FR1 carrier frequency, the value scs15or60 corresponds to 15 kHz and the value scs30or120 corresponds to 30 kHz. If the UE acquires this MIB on an FR2 carrier frequency, the value scs15or60 corresponds to 60 kHz and the value scs30or120 corresponds to 120 kHz.

In initial cell selection, the UE may determine whether there is a control resource set (CORESET) for a Type0-PDCCH common search space based on the MIB. The Type0-PDCCH common search space is a kind of a PDCCH search space, and is used to transmit a PDCCH scheduling an SI message. In the presence of a Type0-PDCCH common search space, the UE may determine (i) a plurality of consecutive RBs and one or more consecutive symbols in a CORESET and (ii) PDCCH occasions (i.e., time-domain positions for PDCCH reception), based on information (e.g., pdcch-ConfigSIB1) in the MIB. Specifically, pdcch-ConfigSIB1 is 8-bit information, (i) is determined based on the most significant bits (MSB) of 4 bits, and (ii) is determined based on the least significant bits (LSB) of 4 bits.

In the absence of any Type0-PDCCH common search space, pdcch-ConfigSIB1 provides information about the frequency position of an SSB/SIB1 and a frequency range free of an SSB/SIB1.

For initial cell selection, a UE may assume that half frames with SS/PBCH blocks occur with a periodicity of 2 frames. Upon detection of a SS/PBCH block, the UE determines that a control resource set for Type0-PDCCH common search space is present if $k_{SSB} \leq 23$ for FR1 (Frequency Range 1; Sub-6 GHz; 450 to 6000 MHz) and if $k_{SSB} \leq 11$ for FR2 (Frequency Range 2; mm-Wave; 24250 to 52600 MHz). The UE determines that a control resource set for Type0-PDCCH common search space is not present if $k_{SSB}>23$ for FR1 and if $k_{SSB}>11$ for FR2. $k_{SSB}$ represents a frequency/subcarrier offset between subcarrier 0 of SS/PBCH block to subcarrier 0 of common resource block for SSB. For FR2 only values up to 11 are applicable. $k_{SSB}$ may be signaled through the MIB.

SIB1 includes information related to the availability and scheduling (e.g., a transmission periodicity and an SI-window size) of the other SIBs (hereinafter, referred to as SIBx where x is an integer equal to or larger than 2). For example, SIB1 may indicate whether SIBx is broadcast periodically or provided by an UE request in an on-demand manner. When SIBx is provided in the on-demand manner, SIB1 may include information required for the UE to transmit an SI request. SIB1 is transmitted on a PDSCH, and a PDCCH scheduling SIB1 is transmitted in a Type0-PDCCH common search space. SIB1 is transmitted on a PDSCH indicated by the PDCCH.

SIBx is included in an SI message and transmitted on a PDSCH. Each SI message is transmitted within a time window (i.e., an SI-window) which takes place periodically.

Figure 6:
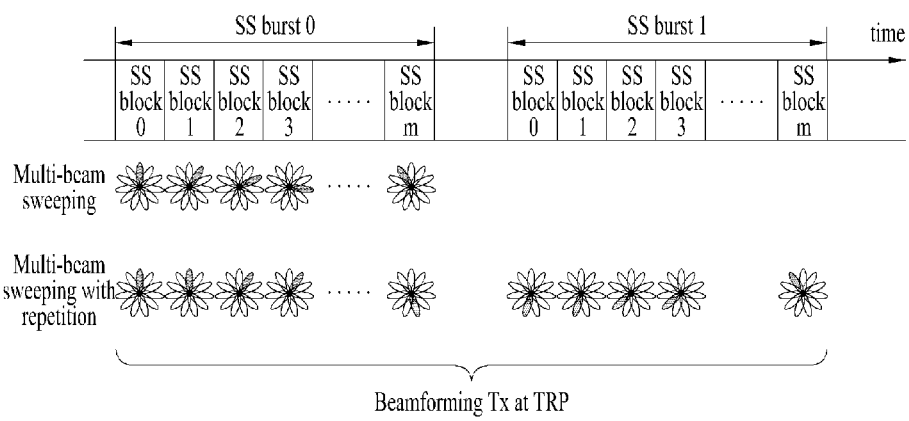
FIG. 6 illustrates exemplary multi-beam transmission of an SSB.

FIG. 6 illustrates exemplary multi-beam transmission of an SSB. Beam sweeping refers to changing the beam (direction) of a wireless signal over time at a transmission reception point (TRP) (e.g., a BS/cell) (hereinbelow, the terms beam and beam direction are interchangeably used). An SSB may be transmitted periodically by beam sweeping. In this case, SSB indexes are implicitly linked to SSB beams. An SSB beam may be changed on an SSB (index) basis. The maximum transmission number L of an SSB in an SSB burst set is 4, 8 or 64 according to the frequency band of a carrier. Accordingly, the maximum number of SSB beams in the SSB burst set may be given according to the frequency band of a carrier as follows.

For frequency range up to 3 GHz, Max number of beams=4

For frequency range from 3 GHz to 6 GHz, Max number of beams=8

For frequency range from 6 GHz to 52.6 GHz, Max number of beams=64

Without multi-beam transmission, the number of SS/PBCH block beams is 1.

When a UE attempts initial access to a BS, the UE may perform beam alignment with the BS based on an SS/PBCH block. For example, after SS/PBCH block detection, the UE identifies a best SS/PBCH block. Subsequently, the UE may transmit an RACH preamble to the BS in PRACH resources linked/corresponding to the index (i.e., beam) of the best SS/PBCH block. The SS/PBCH block may also be used in beam alignment between the BS and the UE after the initial access.

Figure 7:
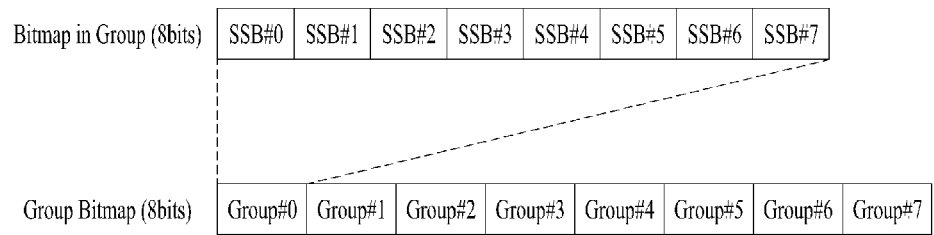
FIG. 7 illustrates an exemplary method of indicating an actually transmitted SSB.

FIG. 7 illustrates an exemplary method of indicating an actually transmitted SSB (SSB_tx). Up to L SS/PBCH blocks may be transmitted in an SS/PBCH block burst set, and the number/positions of actually transmitted SS/PBCH blocks may be different for each BS/cell. The number/positions of actually transmitted SS/PBCH blocks are used for rate-matching and measurement, and information about actually transmitted SS/PBCH blocks is indicated as follows.

If the information is related to rate-matching: the information may be indicated by UE-specific RRC signaling or remaining minimum system information (RMSI). The UE-specific RRC signaling includes a full bitmap (e.g., of length L) for frequency ranges below and above 6 GHz. The RMSI includes a full bitmap for a frequency range below 6 GHz and a compressed bitmap for a frequency range above 6 GHz, as illustrated. Specifically, the information about actually transmitted SS/PBCH blocks may be indicated by a group-bitmap (8 bits)+an in-group bitmap (8 bits). Resources (e.g., REs) indicated by the UE-specific RRC signaling or the RMSI may be reserved for SS/PBCH block transmission, and a PDSCH/PUSCH may be rate-matched in consideration of the SS/PBCH block resources.

If the information is related to measurement: the network (e.g., BS) may indicate an SS/PBCH block set to be measured within a measurement period, when the UE is in RRC connected mode. The SS/PBCH block set may be indicated for each frequency layer. Without an indication of an SS/PBCH block set, a default SS/PBCH block set is used. The default SS/PBCH block set includes all SS/PBCH blocks within the measurement period. An SS/PBCH block set may be indicated by a full bitmap (e.g., of length L) in RRC signaling. When the UE is in RRC idle mode, the default SS/PBCH block set is used.

Random Access Operation and Related Operation

When there is no PUSCH transmission resource (i.e., uplink grant) allocated by the BS, the UE may perform a random access operation. Random access of the NR system can occur 1) when the UE requests or resumes the RRC connection, 2) when the UE performs handover or secondary cell group addition (SCG addition) to a neighboring cell, 3) when a scheduling request is made to the BS, 4) when the BS indicates random access of the UE in PDCCH order, or 5) when a beam failure or RRC connection failure is detected.

The RACH procedure of LTE and NR consists of 4 steps of Msg1 (PRACH preamble) transmission from the UE, Msg2 (RAR, random access response) transmission from the BS, Msg3 (PUSCH) transmission from the UE, and Msg4 (PDSCH) transmission from the BS. That is, the UE transmits a physical random access channel (PRACH) preamble and receives an RAR as a response thereto. When the preamble is a UE-dedicated resource, that is, in the case of contention free random access (CFRA), the random access operation is terminated by receiving the RAR corresponding to the UE itself. If the preamble is a common resource, that is, in the case of contention based random access (CBRA), after the RAR including an uplink PUSCH resource and a RACH preamble ID (RAPID) selected by the UE is received, Msg3 is transmitted through a corresponding resource on the PUSCH. And after a contention resolution message is received on the PDSCH, the random access operation is terminated. In this case, a time and frequency resources to/on which the PRACH preamble signal is mapped/transmitted is defined as RACH occasion (RO), and a time and frequency resource to/on which the Msg3 PUSCH signal is mapped/transmitted is defined as PUSCH occasion (PO).

The above-mentioned short PRACH format comprises values defined in Table 5. Here, $\mu$ is defined as one of $\{0, 1, 2, 3\}$ according to the value of subcarrier spacing. For example, in the case of 15 kHz subcarrier spacing, $\mu$ is 0. In the case of 30 kHz subcarrier spacing, $\mu$ is 1. Table 5 shows Preamble formats for $L_{RA}=139$ and $\Delta f^{RA}=15\times 2^\mu$ kHz, where $\mu \in \{0,1,2,3\}$, $\kappa = T_s/T_c = 64$.

TABLE 5

| Format | $L_{RA}$ | $\Delta f^{RA}$ | $N_u$ | $N_{CP}^{RA}$ |
| --- | --- | --- | --- | --- |
| A1 | 139 | $15 \times 2^\mu$ kHz | $2 \times 2048\kappa \times 2^{-\mu}$ | $288\kappa \times 2^{-\mu}$ |
| A2 | 139 | $15 \times 2^\mu$ kHz | $4 \times 2048\kappa \times 2^{-\mu}$ | $576\kappa \times 2^{-\mu}$ |
| A3 | 139 | $15 \times 2^\mu$ kHz | $6 \times 2048\kappa \times 2^{-\mu}$ | $864\kappa \times 2^{-\mu}$ |
| B1 | 139 | $15 \times 2^\mu$ kHz | $2 \times 2048\kappa \times 2^{-\mu}$ | $216\kappa \times 2^{-\mu}$ |
| B2 | 139 | $15 \times 2^\mu$ kHz | $4 \times 2048\kappa \times 2^{-\mu}$ | $360\kappa \times 2^{-\mu}$ |
| B3 | 139 | $15 \times 2^\mu$ kHz | $6 \times 2048\kappa \times 2^{-\mu}$ | $504\kappa \times 2^{-\mu}$ |
| B4 | 139 | $15 \times 2^\mu$ kHz | $12 \times 2048\kappa \times 2^{-\mu}$ | $936\kappa \times 2^{-\mu}$ |
| C0 | 139 | $15 \times 2^\mu$ kHz | $2048\kappa \times 2^{-\mu}$ | $1240\kappa \times 2^{-\mu}$ |
| C2 | 139 | $15 \times 2^\mu$ kHz | $4 \times 2048\kappa \times 2^{-\mu}$ | $2048\kappa \times 2^{-\mu}$ |

The BS can announce which PRACH format can be transmitted as much as a specific duration at a specific timing through higher layer signaling (RRC signaling or MAC CE or DCI, etc.) and how many ROs (RACH occasions or PRACH occasions) are in the slot. Table 6 shows a part of PRACH configuration indexes that can use A1, A2, A3, B1, B2, B3.

TABLE 6

| PRACH Configuration Index | Preamble format | $n_{SFN}$ mod $x = y$ | | Subframe number | Starting symbol | Number of PRACH slots within a subframe | $N_t^{RA, slot}$, number of time-domain PRACH occasions within a PRACH slot | $N_{dur}^{RA}$, PRACH duration |
| --- | --- | --- | --- | --- | --- | --- | --- | --- |
| | | x | y | | | | | |
| 81 | A1 | 1 | 0 | 4.9 | 0 | 1 | 6 | 2 |
| 82 | A1 | 1 | 0 | 7.9 | 7 | 1 | 3 | 2 |
| 100 | A2 | 1 | 0 | 9 | 9 | 1 | 1 | 4 |
| 101 | A2 | 1 | 0 | 9 | 0 | 1 | 3 | 4 |
| 127 | A3 | 1 | 0 | 4.9 | 0 | 1 | 2 | 6 |
| 128 | A3 | 1 | 0 | 7.9 | 7 | 1 | 1 | 6 |
| 142 | B1 | 1 | 0 | 4.9 | 2 | 1 | 6 | 2 |
| 143 | B1 | 1 | 0 | 7.9 | 8 | 1 | 3 | 2 |
| 221 | A1/B1 | 1 | 0 | 4.9 | 2 | 1 | 6 | 2 |
| 222 | A1/B1 | 1 | 0 | 7.9 | 8 | 1 | 3 | 2 |
| 235 | A2/B2 | 1 | 0 | 4.9 | 0 | 1 | 3 | 4 |
| 236 | A2/B2 | 1 | 0 | 7.9 | 6 | 1 | 2 | 4 |
| 251 | A3/B3 | 1 | 0 | 4.9 | 0 | 1 | 2 | 6 |
| 252 | A3/B3 | 1 | 0 | 7.9 | 2 | 1 | 2 | 6 |

In Rel. 16 NR and NR-U, a 2-step RACH procedure has been introduced, which is a reduced procedure for the 4-step RACH procedure. The 2-step RACH procedure is composed of MsgA (PRACH preamble+Msg3 PUSCH) transmission from the UE and MsgB (RAR+Msg4 PDSCH) transmission from the gNB.

Figure 8:
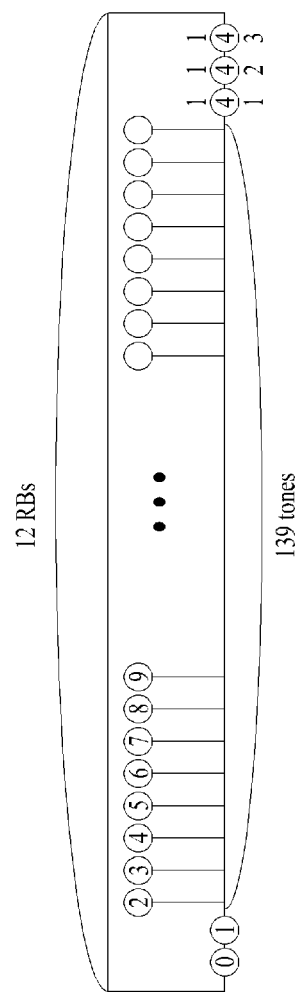
FIG. 8 illustrates an example of PRACH transmission in the NR system.

The PRACH format for transmitting the PRACH preamble in the NR system consists of a format composed of a length 839 sequence (named as a long RACH format for simplicity) and a format composed of a length 139 sequence (named as a short RACH format for simplicity). For example, in frequency range 1 (FR1), the sub-carrier spacing (SCS) of the short RACH format is defined as 15 or 30 kHz. Also, as shown in FIG. 8, RACH can be transmitted on 139 tones among 12 RBs (144 REs). In FIG. 8, 2 null tones are assumed for the lower RE index and 3 null tones are assumed for the upper RE index, but the positions may be changed.

Figure 9:
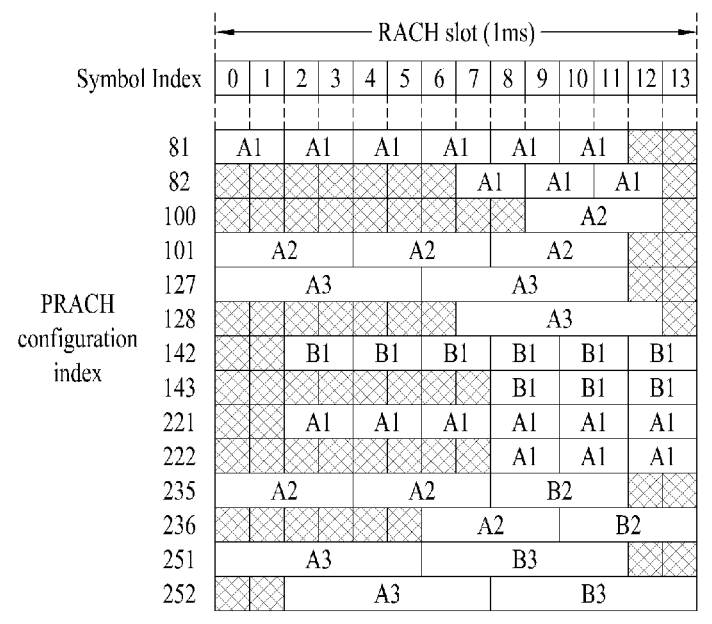

Referring to Table 6, information about the number of ROs defined in a RACH slot for each preamble format (i.e., $N_t^{RA, slot}$: number of time-domain PRACH occasions within a PRACH slot), and the number of OFDM symbols occupied by each PRACH preamble for the preamble format (i.e., $N_{dur}^{RA}$, PRACH duration) can be known. In addition, by indicating the starting symbol of the first RO, information about the time at which the RO starts in the RACH slot can also be provided. FIG. 9 shows the configuration of the ROs in the RACH slot according to the PRACH configuration index values shown in Table 6.

The above descriptions (3GPP system, frame structure, NR system, etc.) may be applied in combination with the methods proposed in the present disclosure, which will be described later, or used as supplements to clarify the technical features of the methods proposed in the present disclosure. In this document, '/' may mean 'and', 'or', or 'and/or' depending on the context.

In NR, the UE may support beamforming-based reception for DL reception. That is, the UE may receive a DL signal on a specific beam among a plurality of candidate beams. In particular, when the UE is in connected mode, the BS and UE may maintain an optimal beam for the UE through a beam management (BM) procedure. Accordingly, the BS may transmit a PDCCH/PDSCH on the optimal TX beam suitable for the UE, and the UE may receive the PDCCH/PDSCH on the optimal RX beam.

In REL-17 NR, an improved paging transmission/reception method is being discussed for a specific type of UE to reduce the power consumption of the UE or extend the reception range of the UE. At the same time, backward compatibility needs to be provided to UEs that receives a conventional paging message. Accordingly, the present disclosure proposes a method of transmitting a transport block (TB) for a paging message and a method of transmitting an additional paging message to reduce power consumption.

The present disclosure proposes a method of transmitting a TB for a paging message and a method of transmitting an additional paging message for a specific type of UE based on reserved bits of existing DCI. In this case, the specific type of UE may be a UE having reduced capabilities, which does not support some or all of the conventional UE capabilities, or a UE requiring enhanced cell coverage. In this document, such a UE is called an RUE or R-UE, and a conventional UE is called an NUE or N-UE.

1) Transmitter (BS)

In the present disclosure, the BS may be configured to apply different paging transmissions according to the capabilities of the UE. To this end, the UE may transmit the paging capability of the UE to the BS at the request of the BS while in RRC_CONNECTED. The paging capability may indicate whether the UE is capable of supporting the paging transmission method of present disclosure. The BS may forward the paging capability to an access and mobility management function (AMF), and the AMF may store the paging capability of the corresponding UE in the UE context.

The BS may instruct the UE to switch from the RRC_CONNECTED state to the RRC_IDLE or RRC_INACTIVE state according to the command of the AMF or the determination of the BS. To this end, the BS may transmit an RRC release message to the UE. Alternatively, the BS may broadcast some or all of the configuration information in system information.

When the UE is in RRC_IDLE, if DL data for the UE arrives at the 3GPP network, the AMF may instruct the BS to transmit paging. In this case, the AMF may provide the paging capability of the UE to the BS. When the UE is RRC_INACTIVE, if DL data for the UE arrives at an anchor BS, the anchor BS may transmit paging or instruct a neighboring BS to transmit paging. The anchor BS may provide the paging capability of the UE to the neighboring BS. A paging message transmitted for the paging transmission may include the UE ID of the UE.

If there is paging for the UE, the BS may transmit a TRS, a CSI-RS, or a wake-up signal (WUS) before paging transmission to improve the paging reception capability of the UE.

If there is paging for the UE, the BS may transmit DCI in CORESET0 and a search space set. The DCI may include an indicator indicating one or multiple UEs. The DCI may be scrambled with a CRC by a P-RNTI. In addition, the DCI may be transmitted on a paging occasion for the UE.

Paging DCI may include information as shown in Table 7 below.

TABLE 7

Short Messages Indicator - 2 bits according to Table 7.3.1.2.1-1.
Short Messages - 8 bits, according to Clause 6.5 of [9, TS38.331]. If only the scheduling information for Paging is carried, this bit field is reserved.
Frequency domain resource assignment
Time domain resource assignment - 4 bits as defined in Clause 5.1.2.1 of [6, TS38.214]. If only the short message is carried, this bit field is reserved.
VRB-to-PRB mapping - 1 bit according to Table 7.3.1.2.2-5. If only the short message is carried, this bit field is reserved.
Modulation and coding scheme - 5 bits as defined in Clause 5.1.3 of [6, TS38.214], using Table 5.1.3.1-1. If only the short message is carried, this bit field is reserved.
TB scaling - 2 bits as defined in Clause 5.1.3.2 of [6, TS38.214]. If only the short message is carried, this bit field is reserved.
Reserved bits - 8 bits for operation in a cell with shared spectrum channel access; otherwise 6 bits FIG. 10 illustrates an example of PDSCH repetitions for paging.

Figure 10:
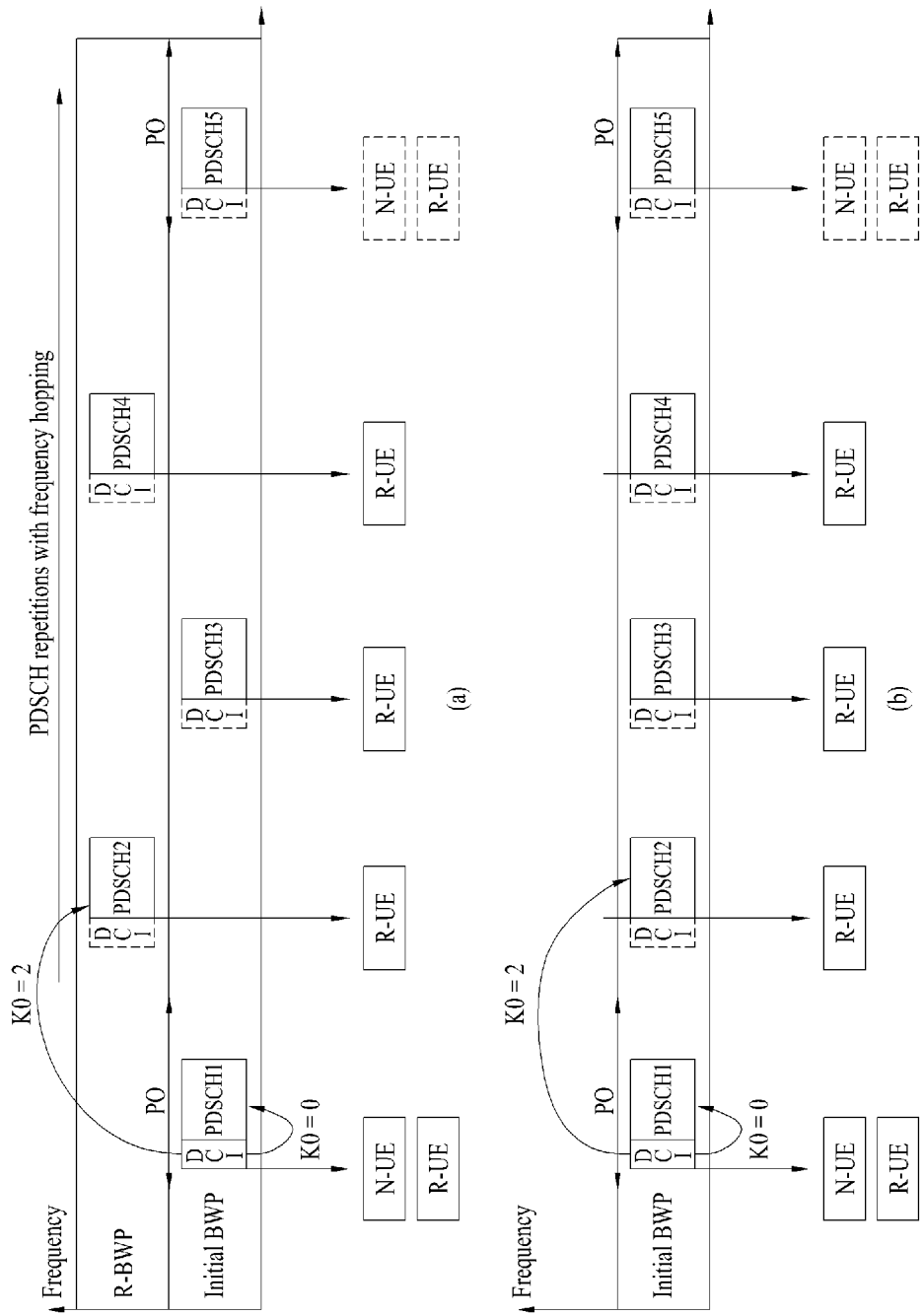
FIG. 10 illustrates an example of PDSCH repetitions for paging of the present disclosure.

In FIG. 10, the N-UE refers to a UE that supports all of the conventional UE capabilities, and such a UE is hereinafter referred to as a NUE or N-UE. The R-UE may be a UE with reduced capabilities, which does not support some or all of the conventional UE capabilities, or a UE that requires enhanced cell coverage. Such a UE is hereinafter referred to as a RUE or R-UE.

The BS may indicate a slot offset K0 and a start and length indicator (SLIV) for the first PDSCH transmission indicated by DCI or a start symbol S, an allocation length L, and a PDSCH mapping type by a time domain resource assignment field. In this case, K0 may provide an interval between the DCI and the PDSCH scheduled by the DCI.

Referring to FIG. 10, the first PDSCH transmission corresponds to PDSCH 1. Since K0=0, DCI may be located on the left adjacent to PDSCH 1. In the present disclosure, K0 may be interpreted in a different way. In an exemplary embodiment, even if K0=3, the interval between the DCI and the PDSCH scheduled by the DCI may be 5 slots.

Referring to FIG. 10(a), an additional BWP exists for the RUE, and such a BWP is referred to as an R-BWP. An initially indicated BWP is referred to as an initial BWP.

In FIG. 10(a), PDSCH 1 may include a paging message for the NUE and RUE. Additional transmission of PDSCH 2, PDSCH 3, and PDSCH 4 for the RUE may be scheduled by reserved bits of the DCI. In FIG. 10(a), since K0=2 for PDSCH 2, the RUE may expect to receive PDSCH 2 after an interval of two slots from the DCI.

The DCI may include information on K0=4 for PDSCH 3 and K0=6 for PDSCH 4. FIG. 10(b) shows a case in which there is no separate BWP for the RUE. The same content as in FIG. 10(a) will not be described.

In the present disclosure, transmission of the following PDSCHs (e.g., PDSCH 2 or subsequent PDSCHs) may be scheduled by reserved bits of DCI.

Same TB Indicator or Different TB Indicators
  Additional PDSCH transmission may carry the same TB (i.e., TB 1) as that carried by the first PDSCH, PDSCH 1. Alternatively, the additional PDSCH transmission may carry another TB (i.e., TB 2). To identify these TBs, DCI may include the same TB indicator or different TB indicators. That is, the DCI may indicate whether PDSCH 1 and PDSCHx (x>1) carry the same TB or different TBs.

Each of TB 1 and TB 2 may contain a paging message. When TB 1 and TB 2 are different, the UE IDs of different UEs may be included, or additional information about the UE IDs of the same UEs may be included. When TB 1 and TB 2 are different, TB 1 may be received by a conventional UE, and TB 2 may be received by a specific type of UE. The specific type of UE may include a UE having reduced capabilities or a UE requiring coverage enhancement.

This information may be included in SIB1 rather than DCI, or the information may be preconfigured to the UE.

BWP ID

PDSCHx (x>1) transmission may indicate the ID of an additionally used DL BWP.

Additional PDSCHs may be transmitted in a DL BWP that is always indicated or in an R-BWP preconfigured by SIB1. Alternatively, the additional PDSCHs may be transmitted alternately in the R-BWP and the initial BWP as shown in FIG. 10. Alternatively, the additional PDSCHs may be transmitted alternately in the indicated DL BWP and the initial BWP. In this case, the detailed configuration of the indicated DL BWP may be transmitted through SIB1 or SIBx.

When PDSCHx (x>1) transmission is configured only in the initial BWP, no BWP ID may be included, or the BWP ID may be set to '0'.

This information may be included in SIB1 rather than DCI, or the information may be preconfigured to the UE.

Frequency Hopping Pattern

When PDSCHx (x>1) is transmitted alternately in the R-BWP and the initial BWP as shown in FIG. 10 or transmitted alternately in the indicated DL BWP and the initial BWP, a frequency hopping pattern may be indicated.

This information may be included in SIB1 rather than DCI, or the information may be preconfigured to the UE.

Additional Frequency Domain Resource Assignment

Frequency resources may be allocated to transmit PDSCHx (x>1). If this information is not included, it may be assumed that transmission is performed based on frequency domain resource assignment.

This information may be included in SIB1 rather than DCI, or the information may be preconfigured to the UE.

Additional Time Domain Resource Assignment

A time gap between PDSCHx (x>1) and DCI may be indicated. For example, when K0 is set to 2 as shown in FIG. 10, DCI and PDSCH 2 may transmitted at an interval of two slots.

Alternatively, a time gap between PDSCHx (x>1) and a previous PDSCH may be indicated. For example, when K0 is set to 2 as shown in FIG. 10, PDCH 1 and PDSCH 2 may be transmitted at an interval of two slots. If there is no separate indication about PDSCH 3, PDSCH 2 and PDSCH 3 may be transmitted at the interval of two slots. Then, other PDSCHs may also be transmitted with the fixed interval of two slots.

This information may be included in SIB1 rather than DCI, or the information may be preconfigured to the UE.

In this case, candidate values of K0 may be configured first by SIB1 or SIBx. In this case, DCI includes an index indicating one of the candidate values. For example, when a set of candidate K0 values is defined as {0, 1, . . . , invalid}, if K0=3 is indicated by paging DCI, an actual K0 value may be determined based on a candidate K0 value mapped to the actual value of 3. For example, when the third candidate value is set to 5 by SIB1, K0=3 of DCI may mean that K0 actually corresponds to 5 slots.

Additional time domain resource assignment may be represented as a difference from the conventional time domain resource assignment value.

Additional VRB-to-PRB Mapping

VRB-to-PRB mapping for PDSCHx (x>1) transmission may be configured. If this information is not included, conventional VRB-to-PRB mapping may be assumed.

The information may be included in SIB1 rather than DCI, or the information may be preconfigured to the UE.

Additional Modulation and Coding Scheme

The modulation and coding scheme (MCS) value for PDSCHx (x>1) transmission may be indicated. The MCS value may be represented as a difference from the conventional MCS. In this case, if additional MCS=0, it is assumed that the conventional MCS and the additional MCS may have the same value. If this information is not included, the conventional MCS may be assumed.

This information may be included in SIB1 rather than DCI, or the information may be preconfigured to the UE.

TB Scaling

The TB scaling value for PDSCHx (x>1) transmission may be indicated.

This information may be included in SIB1 rather than DCI, or the information may be preconfigured to the UE.

UE Type or UE Capability Index

The type of UE that will receive PDSCHx (x>1) transmission may be indicated. For example, it may be informed that such a UE is the RUE or a specific UE among RUEs. A result obtained by the modulo operation may be indicated by a UE ID so that only UEs having the same operation result may receive PDSCHx (x>1).

A UE requiring coverage enhancement may be indicated. For example, if 0 is indicated, a UE requiring coverage enhancement may perform reception. If 1 is indicated, a UE that does not require coverage enhancement may perform reception. Alternatively, the coverage enhancement level may be indicated.

Access Control

Access control information to be applied by the RUE may be transmitted. For example, whether all or some of the RUEs need to stop UL transmission for a while may be indicated. This may be applied only to UEs monitoring the corresponding PO.

TCI State

The TCI state of PDSCHx (x>1) transmission may be indicated. If the corresponding information does not exist, the UE may assume that the TCI state of the PDSCHx (x>1) transmission is the same as that of PDSCH 1 transmission. Alternatively, the UE may attempt to receive DCI for each PDSCH by assuming that DCI for PDSCHx is separately transmitted.

If only TB 2 is transmitted, the BS may transmit only PDSCHx (x>1). In this case, DCI for PDSCH 1 is not transmitted, and separate DCI may be transmitted in a slot in which PDSCHx is transmitted or a previous slot. For example, referring to FIG. 10, the DCI on the left side of PDSCH 1 may not be transmitted, but the DCI on the left side of PDSCH 2 may be transmitted. In this case, the DCI of PDSCH 2 may include additional information on transmission of other subsequent PDSCHs.

2) Receiver (UE)

The UE may select a cell and camp on the cell. In this case, the UE may be a UE having reduced capabilities that does not support some or all of the conventional UE capabilities or a UE requiring enhanced cell coverage. Such a UE is called a RUE or R-UE, and a conventional UE is called a NUE or N-UE.

In the present disclosure, it is assumed that the RUE and NUE monitor the same paging occasion (PO). During the PO, the UEs may receive the same DCI in CORESET0 and the same search space set.

Information in DCI may be the same as described above. When DCI includes additional information or when the information is included in SIB1 or preconfigured, the RUE may operate as follows.

Same TB Indicator or Different TB Indicators

When TB 1 and TB 2 are the same, that is, when the same TB indicator is indicated, the RUE may receive TB 1 and TB 2 based on soft combining. In other words, the RUE may decode all PDSCHx (x>1) transmissions based on the soft combining.

When TB 1 and TB 2 are different, the RUE may receive only TB 2. The RUE may decode TB 2 by performing the soft combining on all PDSCHx (x>1) transmissions. If the RUE fails to decode TB 2, the RUE may receive TB 2 again during one of the following POs.

Alternatively, the RUE may decode TB 1 and TB 2 separately and combine paging information in TB 1 and TB 2 at the L2 or L3 layer. The RUE may decode TB 1 by receiving PDSCH 1 and decode TB 2 by performing the soft combining on all PDSCHx (x>1) transmissions. If the RUE fails to decode TB 1 or TB 2, the RUE may receive TB 1 or TB 2 again during one of the following POs. In this case, the RUE may receive only a TB that the RUE fails to decode. The UE may directly transmit a successfully decoded TB to higher layers. Alternatively, when successfully decoding both TB 1 and TB 2, the UE may provide the two TBs to higher layers.

BWP ID

After reception of DCI or reception of the DCI and PDSCH 1, the RUE may receive PDSCHx by switching to a BWP indicated by a BWP ID.

Frequency Hopping Pattern

The UE may receive multiple PDSCHx transmissions while performing BWP switching based on this information. For example, referring to FIG. 10, the UE may receive the multiple PDSCHx transmissions by performing soft combining thereon while switching between the R-BWP and initial BWP.

Additional Frequency Domain Resource Assignment

The UE may receive PDSCHx based on this information.

Additional Time Domain Resource Assignment

The UE may receive PDSCHx based on this information.

When K0>0, the UE may consider that additional PDSCHx is transmitted. On the other hand, when K0=0, the UE may receive only PDSCH 1 by assuming that there is no additional PDSCHx transmission or may not receive all PDSCHs.

On the other hand, if DCI indicates that K0=invalid, the RUE may receive paging through TB 1 or may not receive TB 1.

Additional VRB-to-PRB Mapping, Additional Modulation and Coding Scheme, and TB Scaling The UE may receive PDSCHx based on this information.

UE Type or UE Capability Index

The type of UE that will receive PDSCHx (x>1) transmission may be indicated. For example, it may be informed that such a UE is the RUE or a specific UE among RUEs. A result obtained by the modulo operation may be indicated by a UE ID so that only UEs having the same operation result may receive PDSCHx (x>1).

A UE requiring coverage enhancement may be indicated. For example, if 0 is indicated, a UE requiring coverage enhancement may perform reception. If 1 is indicated, a UE that does not require coverage enhancement may perform reception. Alternatively, the coverage enhancement level may be indicated. If the current coverage enhancement level or state of the UE does not correspond to the indicated information, the RUE may trigger a RACH to report the current coverage enhancement level or state to the BS.

The UE may receive the PDSCHx (x>1) transmission only when the UE corresponds to this information. On the other hand, the UE may receive the PDSCHx (x>1) transmission only when the UE corresponds to this information.

Access Control

Access control information to be applied by the RUE may be transmitted. For example, whether all or some of the RUEs need to stop UL transmission for a while may be indicated. This may be applied only to UEs monitoring the corresponding PO.

If the corresponding information exists, the UE may determine whether to perform access based on to the access control information. In this case, the UE may attempt the RACH after temporarily stopping UL transmission or immediately attempt the RACH.

TCI State

The TCI state of PDSCHx (x>1) transmission may be indicated. The UE may receive the PDSCHx (x>1) transmission based on the indicated TCI state.

If the corresponding information does not exist, the UE may assume that the TCI state of the PDSCHx (x>1) transmission is the same as that of PDSCH 1 transmission. Alternatively, the UE may attempt to receive DCI for each PDSCH by assuming that DCI for PDSCHx is separately transmitted.

If the above-described additional information is not provided, the RUE may receive only TB 1 over PDSCH 1. In this case, TB 1 may include only the UE ID of the RUE or may include the UE IDs of both the NUE and RUE. If TB 1 and TB 2 are different, TB 1 may be used only for the NUE, and TB 2 may be used only for the RUE.

Alternatively, RUEs that will receive TB 1 and RUEs that will receive TB 2 may be indicated by DCI, SIB1, or SIBx. For example, RUEs divided into different groups may selectively receive TB 1 or TB 2. In addition, the BS may transmit different TBs over PDSCH 1, PDSCH 2, PDSCH 3, PDSCH 4, and so on. In this case, each PDSCHn (n>0) may carry each TB and may be received by different UEs or different UE groups. The different UE groups may be calculated by the modulo operation of UE IDs or configured by the BS or AMF. For example, UE group n may be defined by UE ID mod N, where N is the maximum number of times that the PDSCH is transmitted. DCI may indicate UE groups that need to perform reception by a bitmap, where each bit represents the value of n.

When the RUE receives no DCI during a PO, the RUE may monitor a next PO. Alternatively, the RUE may consider as an additional PO a period where transmission of DCI for PDSCH 2 is expected according to the configuration of the BS. If the UE receives DCI during the additional PO, the UE may decode one TB by receiving only PDSCH 2 according to the current DCI with no additional DCI. Alternatively, the UE may receive multiple PDSCHx transmissions based on the current DCI and additional DCI to decode one TB.

Figure 11:
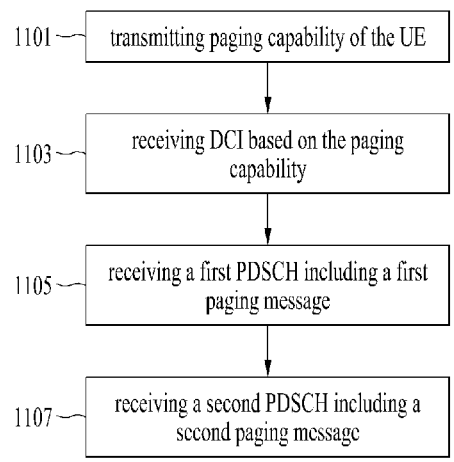
FIG. 11 illustrates a method of receiving a paging message by a user equipment in various embodiments of the present disclosure.

FIG. 11 illustrates a method for a UE to receive a paging message according to various embodiments of the present disclosure.

The UE may transfer the paging capability of the UE to a BS at the request of the BS while in RRC_CONNECTED (1101). The paging capability may indicate whether the UE is capable of supporting the paging transmission method of the present disclosure.

When there is paging for the UE, the BS may configure an RRC paging message and then transmit DCI having a CRC attached thereto to the UE over a PDCCH (1103), where the CRC may be scrambled by a P-RNTI. The BS may transmit the RRC paging message to the UE over a PDSCH (1105 and 1107).

The UE may monitor a first PDCCH in slots belonging to its PO based on the P-RNTI. Upon detecting a PDCCH masked with the P-RNTI, the UE may decode DCI transmitted on the first PDCCH. This DCI may indicate to the UE a first PDSCH resource on which the paging message is transmitted. Then, the UE may decode the RRC paging message from the first PDSCH resource indicated by the DCI.

When the UE is a RUE (that is, when the UE informs the BS that the UE has reduced capabilities so that the UE may not support some or all of the conventional UE capabilities including the paging capability, or when the UE informs the BS that the UE requires enhanced cell coverage), the UE may need to obtain a paging message for the RUE. Accordingly, when the DCI includes additional information on a second PDSCH, the UE may acquire a second paging message by receiving the second PDSCH based on the DCI.

Although FIG. 11 shows that the second PDSCH includes only the additional (second) paging message, the UE may also receive a third PDSCH, . . . , an N-th PDSCH, where N is an integer greater than or equal to 2.

According to the present disclosure, some bits of existing DCI may be used to separately transmit an additional paging message for a specific type of UE. Therefore, the additional paging transmission may effectively coexist with paging transmission for existing UEs.

Figure 12:
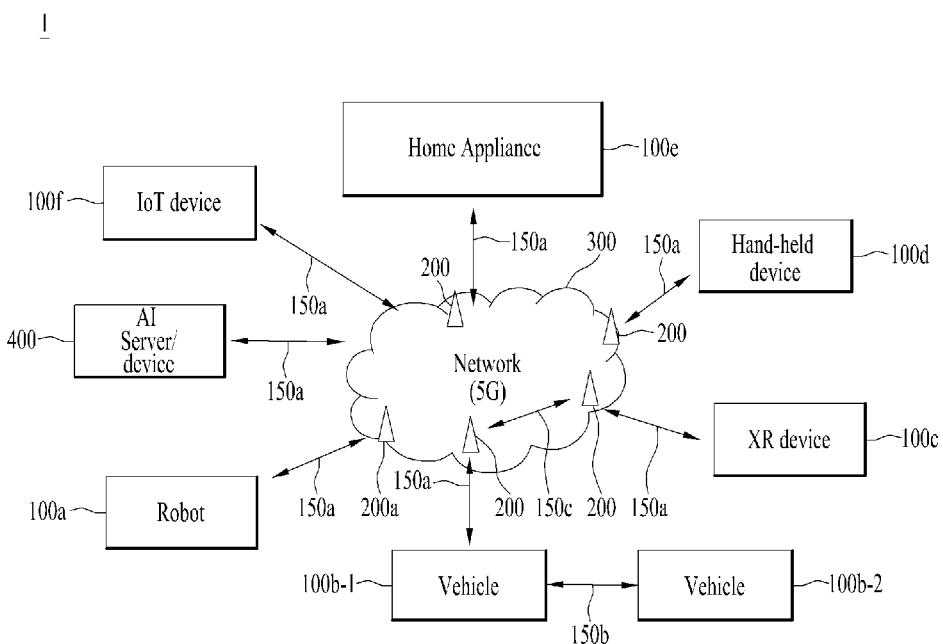
FIG. 12 to FIG. 15 illustrate a communication system 1 and wireless devices applied to the present disclosure.

FIG. 12 illustrates a communication system 1 applied to the present disclosure.

Referring to FIG. 12, a communication system 1 applied to the present disclosure includes wireless devices, Base Stations (BSs), and a network. Herein, the wireless devices represent devices performing communication using Radio Access Technology (RAT) (e.g., 5G New RAT (NR)) or Long-Term Evolution (LTE)) and may be referred to as communication/radio/5G devices. The wireless devices may include, without being limited to, a robot 100*a*, vehicles 100*b*-1 and 100*b*-2, an eXtended Reality (XR) device 100*c*, a hand-held device 100*d*, a home appliance 100*e*, an Internet of Things (IoT) device 100*f*, and an Artificial Intelligence (AI) device/server 400. For example, the vehicles may include a vehicle having a wireless communication function, an autonomous driving vehicle, and a vehicle capable of performing communication between vehicles. Herein, the vehicles may include an Unmanned Aerial Vehicle (UAV) (e.g., a drone). The XR device may include an Augmented Reality (AR)/Virtual Reality (VR)/Mixed Reality (MR) device and may be implemented in the form of a Head-Mounted Device (HMD), a Head-Up Display (HUD) mounted in a vehicle, a television, a smartphone, a computer, a wearable device, a home appliance device, a digital signage, a vehicle, a robot, etc. The hand-held device may include a smartphone, a smartpad, a wearable device (e.g., a smartwatch or a smartglasses), and a computer (e.g., a notebook). The home appliance may include a TV, a refrigerator, and a washing machine. The IoT device may include a sensor and a smartmeter. For example, the BSs and the network may be implemented as wireless devices and a specific wireless device 200*a* may operate as a BS/network node with respect to other wireless devices.

The wireless devices 100*a* to 100*f* may be connected to the network 300 via the BSs 200. An AI technology may be applied to the wireless devices 100*a* to 100*f* and the wireless devices 100*a* to 100*f* may be connected to the AI server 400 via the network 300. The network 300 may be configured using a 3G network, a 4G (e.g., LTE) network, or a 5G (e.g., NR) network. Although the wireless devices 100*a* to 100*f* may communicate with each other through the BSs 200/network 300, the wireless devices 100*a* to 100*f* may perform direct communication (e.g., sidelink communication) with each other without passing through the BSs/network. For example, the vehicles 100*b*-1 and 100*b*-2 may perform direct communication (e.g. Vehicle-to-Vehicle (V2V)/Vehicle-to-everything (V2X) communication). The IoT device (e.g., a sensor) may perform direct communication with other IoT devices (e.g., sensors) or other wireless devices 100*a* to 100*f*.

Wireless communication/connections 150*a*, 150*b*, or 150*c* may be established between the wireless devices 100*a* to 100*f*/BS 200, or BS 200/BS 200. Herein, the wireless communication/connections may be established through various RATs (e.g., 5G NR) such as uplink/downlink communication 150*a*, sidelink communication 150*b* (or, D2D communication), or inter BS communication (e.g. relay, Integrated Access Backhaul (IAB)). The wireless devices and the BSs/the wireless devices may transmit/receive radio signals to/from each other through the wireless communication/connections 150*a* and 150*b*. For example, the wireless communication/connections 150*a* and 150*b* may transmit/receive signals through various physical channels. To this end, at least a part of various configuration information configuring processes, various signal processing processes (e.g., channel encoding/decoding, modulation/demodulation, and resource mapping/demapping), and resource allocating processes, for transmitting/receiving radio signals, may be performed based on the various proposals of the present disclosure.

Figure 13:
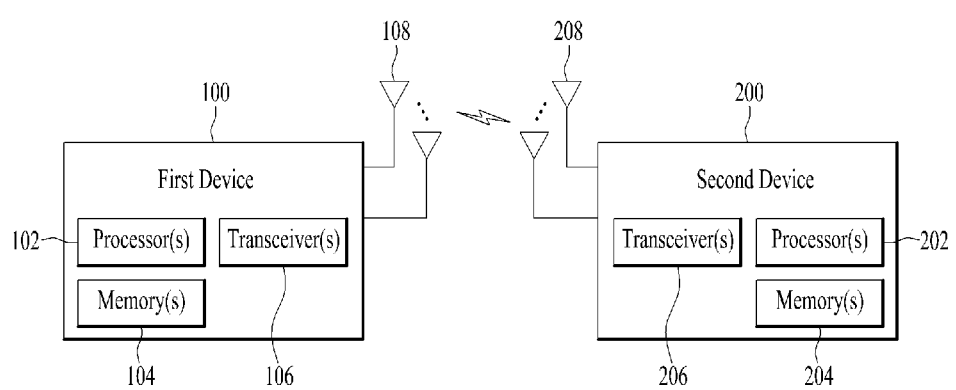

FIG. 13 illustrates wireless devices applicable to the present disclosure.

Referring to FIG. 13, a first wireless device 100 and a second wireless device 200 may transmit radio signals through a variety of RATs (e.g., LTE and NR). Herein, {the first wireless device 100 and the second wireless device 200} may correspond to {the wireless device 100*x* and the BS 200} and/or {the wireless device 100*x* and the wireless device 100*x*} of FIG. 12.

The first wireless device 100 may include one or more processors 102 and one or more memories 104 and additionally further include one or more transceivers 106 and/or one or more antennas 108. The processor(s) 102 may control the memory(s) 104 and/or the transceiver(s) 106 and may be configured to implement the descriptions, functions, procedures, proposals, methods, and/or operational flowcharts disclosed in this document. For example, the processor(s) 102 may process information within the memory(s) 104 to generate first information/signals and then transmit radio signals including the first information/signals through the transceiver(s) 106. The processor(s) 102 may receive radio signals including second information/signals through the transceiver 106 and then store information obtained by processing the second information/signals in the memory(s) 104. The memory(s) 104 may be connected to the processor(s) 102 and may store a variety of information related to operations of the processor(s) 102. For example, the memory(s) 104 may store software code including commands for performing a part or the entirety of processes controlled by the processor(s) 102 or for performing the descriptions, functions, procedures, proposals, methods, and/or operational flowcharts disclosed in this document. Herein, the processor(s) 102 and the memory(s) 104 may be a part of a communication modem/circuit/chip designed to implement RAT (e.g., LTE or NR). The transceiver(s) 106 may be connected to the processor(s) 102 and transmit and/or receive radio signals through one or more antennas 108. Each of the transceiver(s) 106 may include a transmitter and/or a receiver. The transceiver(s) 106 may be interchangeably used with Radio Frequency (RF) unit(s). In the present disclosure, the wireless device may represent a communication modem/circuit/chip.

The second wireless device 200 may include one or more processors 202 and one or more memories 204 and additionally further include one or more transceivers 206 and/or one or more antennas 208. The processor(s) 202 may control the memory(s) 204 and/or the transceiver(s) 206 and may be configured to implement the descriptions, functions, procedures, proposals, methods, and/or operational flowcharts disclosed in this document. For example, the processor(s) 202 may process information within the memory(s) 204 to generate third information/signals and then transmit radio signals including the third information/signals through the transceiver(s) 206. The processor(s) 202 may receive radio signals including fourth information/signals through the transceiver(s) 106 and then store information obtained by processing the fourth information/signals in the memory(s) 204. The memory(s) 204 may be connected to the processor(s) 202 and may store a variety of information related to operations of the processor(s) 202. For example, the memory(s) 204 may store software code including commands for performing a part or the entirety of processes controlled by the processor(s) 202 or for performing the descriptions, functions, procedures, proposals, methods, and/or operational flowcharts disclosed in this document. Herein, the processor(s) 202 and the memory(s) 204 may be a part of a communication modem/circuit/chip designed to implement RAT (e.g., LTE or NR). The transceiver(s) 206 may be connected to the processor(s) 202 and transmit and/or receive radio signals through one or more antennas 208. Each of the transceiver(s) 206 may include a transmitter and/or a receiver. The transceiver(s) 206 may be interchangeably used with RF unit(s). In the present disclosure, the wireless device may represent a communication modem/circuit/chip.

Hereinafter, hardware elements of the wireless devices 100 and 200 will be described more specifically. One or more protocol layers may be implemented by, without being limited to, one or more processors 102 and 202. For example, the one or more processors 102 and 202 may implement one or more layers (e.g., functional layers such as PHY, MAC, RLC, PDCP, RRC, and SDAP). The one or more processors 102 and 202 may generate one or more Protocol Data Units (PDUs) and/or one or more Service Data Unit (SDUs) according to the descriptions, functions, procedures, proposals, methods, and/or operational flowcharts disclosed in this document. The one or more processors 102 and 202 may generate messages, control information, data, or information according to the descriptions, functions, procedures, proposals, methods, and/or operational flowcharts disclosed in this document. The one or more processors 102 and 202 may generate signals (e.g., baseband signals) including PDUs, SDUs, messages, control information, data, or information according to the descriptions, functions, procedures, proposals, methods, and/or operational flowcharts disclosed in this document and provide the generated signals to the one or more transceivers 106 and 206. The one or more processors 102 and 202 may receive the signals (e.g., baseband signals) from the one or more transceivers 106 and 206 and acquire the PDUs, SDUs, messages, control information, data, or information according to the descriptions, functions, procedures, proposals, methods, and/or operational flowcharts disclosed in this document.

The one or more processors 102 and 202 may be referred to as controllers, microcontrollers, microprocessors, or microcomputers. The one or more processors 102 and 202 may be implemented by hardware, firmware, software, or a combination thereof. As an example, one or more Application Specific Integrated Circuits (ASICs), one or more Digital Signal Processors (DSPs), one or more Digital Signal Processing Devices (DSPDs), one or more Programmable Logic Devices (PLDs), or one or more Field Programmable Gate Arrays (FPGAs) may be included in the one or more processors 102 and 202. The descriptions, functions, procedures, proposals, methods, and/or operational flowcharts disclosed in this document may be implemented using firmware or software and the firmware or software may be configured to include the modules, procedures, or functions. Firmware or software configured to perform the descriptions, functions, procedures, proposals, methods, and/or operational flowcharts disclosed in this document may be included in the one or more processors 102 and 202 or stored in the one or more memories 104 and 204 so as to be driven by the one or more processors 102 and 202. The descriptions, functions, procedures, proposals, methods, and/or operational flowcharts disclosed in this document may be implemented using firmware or software in the form of code, commands, and/or a set of commands The one or more memories 104 and 204 may be connected to the one or more processors 102 and 202 and store various types of data, signals, messages, information, programs, code, instructions, and/or commands. The one or more memories 104 and 204 may be configured by Read-Only Memories (ROMs), Random Access Memories (RAMs), Electrically Erasable Programmable Read-Only Memories (EPROMs), flash memories, hard drives, registers, cash memories, computer-readable storage media, and/or combinations thereof. The one or more memories 104 and 204 may be located at the interior and/or exterior of the one or more processors 102 and 202. The one or more memories 104 and 204 may be connected to the one or more processors 102 and 202 through various technologies such as wired or wireless connection.

The one or more transceivers 106 and 206 may transmit user data, control information, and/or radio signals/channels, mentioned in the methods and/or operational flowcharts of this document, to one or more other devices. The one or more transceivers 106 and 206 may receive user data, control information, and/or radio signals/channels, mentioned in the descriptions, functions, procedures, proposals, methods, and/or operational flowcharts disclosed in this document, from one or more other devices. For example, the one or more transceivers 106 and 206 may be connected to the one or more processors 102 and 202 and transmit and receive radio signals. For example, the one or more processors 102 and 202 may perform control so that the one or more transceivers 106 and 206 may transmit user data, control information, or radio signals to one or more other devices. The one or more processors 102 and 202 may perform control so that the one or more transceivers 106 and 206 may receive user data, control information, or radio signals from one or more other devices. The one or more transceivers 106 and 206 may be connected to the one or more antennas 108 and 208 and the one or more transceivers 106 and 206 may be configured to transmit and receive user data, control information, and/or radio signals/channels, mentioned in the descriptions, functions, procedures, proposals, methods, and/or operational flowcharts disclosed in this document, through the one or more antennas 108 and 208. In this document, the one or more antennas may be a plurality of physical antennas or a plurality of logical antennas (e.g., antenna ports). The one or more transceivers 106 and 206 may convert received radio signals/channels etc. from RF band signals into baseband signals in order to process received user data, control information, radio signals/channels, etc. using the one or more processors 102 and 202. The one or more transceivers 106 and 206 may convert the user data, control information, radio signals/channels, etc. processed using the one or more processors 102 and 202 from the base band signals into the RF band signals. To this end, the one or more transceivers 106 and 206 may include (analog) oscillators and/or filters.

Figure 14:
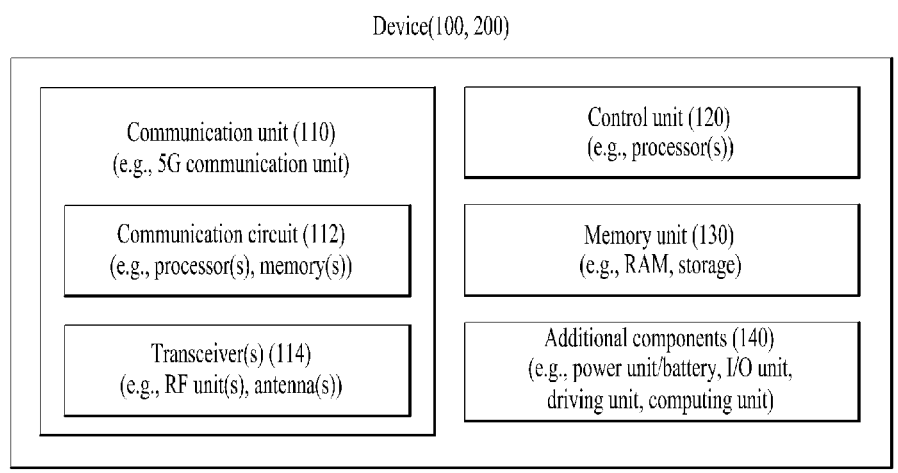

FIG. 14 illustrates another example of a wireless device applied to the present disclosure. The wireless device may be implemented in various forms according to a use-case/service (refer to FIG. 14).

Referring to FIG. 14, wireless devices 100 and 200 may correspond to the wireless devices 100 and 200 of FIG. 13 and may be configured by various elements, components, units/portions, and/or modules. For example, each of the wireless devices 100 and 200 may include a communication unit 110, a control unit 120, a memory unit 130, and additional components 140. The communication unit may include a communication circuit 112 and transceiver(s) 114. For example, the communication circuit 112 may include the one or more processors 102 and 202 and/or the one or more memories 104 and 204 of FIG. 13. For example, the transceiver(s) 114 may include the one or more transceivers 106 and 206 and/or the one or more antennas 108 and 208 of FIG. 13. The control unit 120 is electrically connected to the communication unit 110, the memory 130, and the additional components 140 and controls overall operation of the wireless devices. For example, the control unit 120 may control an electric/mechanical operation of the wireless device based on programs/code/commands/information stored in the memory unit 130. The control unit 120 may transmit the information stored in the memory unit 130 to the exterior (e.g., other communication devices) via the communication unit 110 through a wireless/wired interface or store, in the memory unit 130, information received through the wireless/wired interface from the exterior (e.g., other communication devices) via the communication unit 110.

The additional components 140 may be variously configured according to types of wireless devices. For example, the additional components 140 may include at least one of a power unit/battery, input/output (I/O) unit, a driving unit, and a computing unit. The wireless device may be implemented in the form of, without being limited to, the robot (100a of FIG. 12), the vehicles (100b-1 and 100b-2 of FIG. 12), the XR device (100c of FIG. 12), the hand-held device (100d of FIG. 12), the home appliance (100e of FIG. 12), the IoT device (100f of FIG. 12), a digital broadcast terminal, a hologram device, a public safety device, an MTC device, a medicine device, a fintech device (or a finance device), a security device, a climate/environment device, the AI server/device (400 of FIG. 12), the BSs (200 of FIG. 12), a network node, etc. The wireless device may be used in a mobile or fixed place according to a use-example/service.

In FIG. 14, the entirety of the various elements, components, units/portions, and/or modules in the wireless devices 100 and 200 may be connected to each other through a wired interface or at least a part thereof may be wirelessly connected through the communication unit 110. For example, in each of the wireless devices 100 and 200, the control unit 120 and the communication unit 110 may be connected by wire and the control unit 120 and first units (e.g., 130 and 140) may be wirelessly connected through the communication unit 110. Each element, component, unit/portion, and/or module within the wireless devices 100 and 200 may further include one or more elements. For example, the control unit 120 may be configured by a set of one or more processors. As an example, the control unit 120 may be configured by a set of a communication control processor, an application processor, an Electronic Control Unit (ECU), a graphical processing unit, and a memory control processor. As another example, the memory 130 may be configured by a Random Access Memory (RAM), a Dynamic RAM (DRAM), a Read Only Memory (ROM)), a flash memory, a volatile memory, a non-volatile memory, and/or a combination thereof.

Figure 15:
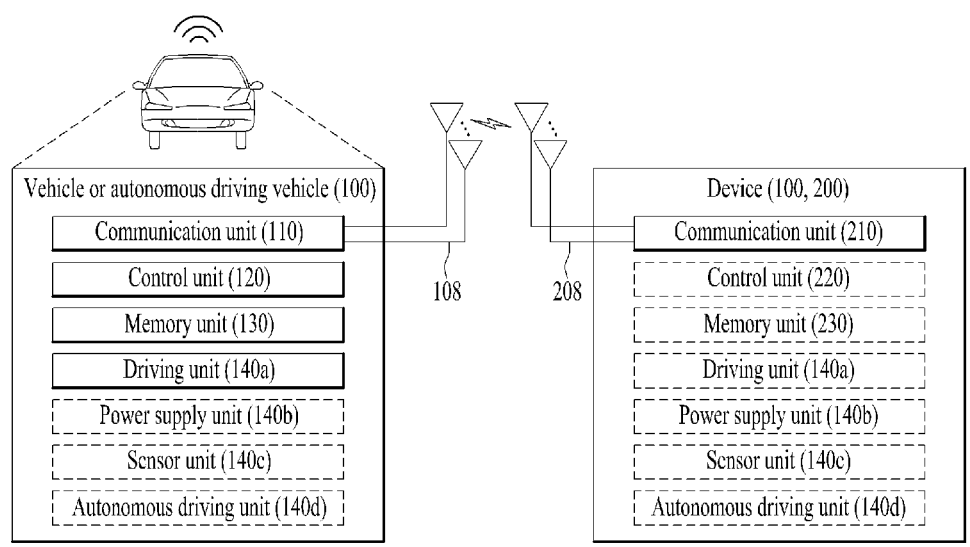

FIG. 15 illustrates a vehicle or an autonomous driving vehicle applied to the present disclosure. The vehicle or autonomous driving vehicle may be implemented by a mobile robot, a car, a train, a manned/unmanned Aerial Vehicle (AV), a ship, etc.

Referring to FIG. 15, a vehicle or autonomous driving vehicle 100 may include an antenna unit 108, a communication unit 110, a control unit 120, a driving unit 140a, a power supply unit 140b, a sensor unit 140c, and an autonomous driving unit 140d. The antenna unit 108 may be configured as a part of the communication unit 110. The blocks 110/130/140a to 140d correspond to the blocks 110/130/140 of FIG. 14, respectively.

The communication unit 110 may transmit and receive signals (e.g., data and control signals) to and from external devices such as other vehicles, BSs (e.g., gNBs and road side units), and servers. The control unit 120 may perform various operations by controlling elements of the vehicle or the autonomous driving vehicle 100. The control unit 120 may include an Electronic Control Unit (ECU). The driving unit 140a may cause the vehicle or the autonomous driving vehicle 100 to drive on a road. The driving unit 140a may include an engine, a motor, a powertrain, a wheel, a brake, a steering device, etc. The power supply unit 140b may supply power to the vehicle or the autonomous driving vehicle 100 and include a wired/wireless charging circuit, a battery, etc. The sensor unit 140c may acquire a vehicle state, ambient environment information, user information, etc. The sensor unit 140c may include an Inertial Measurement Unit (IMU) sensor, a collision sensor, a wheel sensor, a speed sensor, a slope sensor, a weight sensor, a heading sensor, a position module, a vehicle forward/backward sensor, a battery sensor, a fuel sensor, a tire sensor, a steering sensor, a temperature sensor, a humidity sensor, an ultrasonic sensor, an illumination sensor, a pedal position sensor, etc. The autonomous driving unit 140*d* may implement technology for maintaining a lane on which a vehicle is driving, technology for automatically adjusting speed, such as adaptive cruise control, technology for autonomously driving along a determined path, technology for driving by automatically setting a path if a destination is set, and the like.

For example, the communication unit 110 may receive map data, traffic information data, etc. from an external server. The autonomous driving unit 140*d* may generate an autonomous driving path and a driving plan from the obtained data. The control unit 120 may control the driving unit 140*a* such that the vehicle or the autonomous driving vehicle 100 may move along the autonomous driving path according to the driving plan (e.g., speed/direction control). In the middle of autonomous driving, the communication unit 110 may aperiodically/periodically acquire recent traffic information data from the external server and acquire surrounding traffic information data from neighboring vehicles.

In the middle of autonomous driving, the sensor unit 140*c* may obtain a vehicle state and/or surrounding environment information. The autonomous driving unit 140*d* may update the autonomous driving path and the driving plan based on the newly obtained data/information. The communication unit 110 may transfer information about a vehicle position, the autonomous driving path, and/or the driving plan to the external server. The external server may predict traffic information data using AI technology, etc., based on the information collected from vehicles or autonomous driving vehicles and provide the predicted traffic information data to the vehicles or the autonomous driving vehicles.

Figure 16:
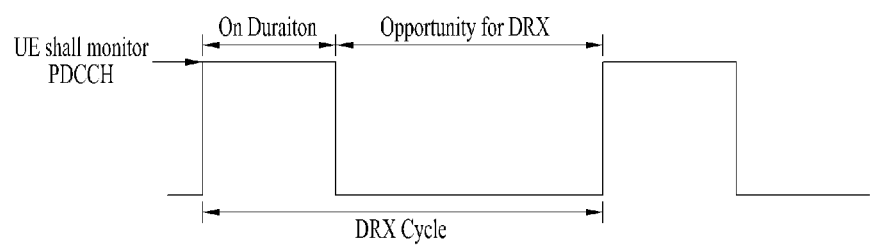
FIG. 16 illustrates an exemplary discontinuous reception (DRX) operation applied to the present disclosure.

FIG. 16 is a diagram illustrating a DRX operation of a UE according to an embodiment of the present disclosure.

The UE may perform a DRX operation in the afore-described/proposed procedures and/or methods. A UE configured with DRX may reduce power consumption by receiving a DL signal discontinuously. DRX may be performed in an RRC_IDLE state, an RRC_INACTIVE state, and an RRC_CONNECTED state. The UE performs DRX to receive a paging signal discontinuously in the RRC_IDLE state and the RRC_INACTIVE state. DRX in the RRC_CONNECTED state (RRC_CONNECTED DRX) will be described below.

Referring to FIG. 16, a DRX cycle includes an On Duration and an Opportunity for DRX. The DRX cycle defines a time interval between periodic repetitions of the On Duration. The On Duration is a time period during which the UE monitors a PDCCH. When the UE is configured with DRX, the UE performs PDCCH monitoring during the On Duration. When the UE successfully detects a PDCCH during the PDCCH monitoring, the UE starts an inactivity timer and is kept awake. On the contrary, when the UE fails in detecting any PDCCH during the PDCCH monitoring, the UE transitions to a sleep state after the On Duration. Accordingly, when DRX is configured, PDCCH monitoring/reception may be performed discontinuously in the time domain in the afore-described/proposed procedures and/or methods. For example, when DRX is configured, PDCCH reception occasions (e.g., slots with PDCCH SSs) may be configured discontinuously according to a DRX configuration in the present disclosure. On the contrary, when DRX is not configured, PDCCH monitoring/reception may be performed continuously in the time domain. For example, when DRX is not configured, PDCCH reception occasions (e.g., slots with PDCCH SSs) may be configured continuously in the present disclosure. Irrespective of whether DRX is configured, PDCCH monitoring may be restricted during a time period configured as a measurement gap.

Table 8 describes a DRX operation of a UE (in the RRC_CONNECTED state). Referring to Table 8, DRX configuration information is received by higher-layer signaling (e.g., RRC signaling), and DRX ON/OFF is controlled by a DRX command from the MAC layer. Once DRX is configured, the UE may perform PDCCH monitoring discontinuously in performing the afore-described/proposed procedures and/or methods, as illustrated in FIG. 5.

|  | Type of signals | UE procedure |
| --- | --- | --- |
| 1$^{st}$ step | RRC signalling(MAC-CellGroupConfig) | Receive DRX configuration information |
| 2$^{nd}$ Step | MAC CE((Long) DRX command MAC CE) | Receive DRX command |
| 3$^{rd}$ Step | — | Monitor a PDCCH during an on-duration of a DRX cycle |

MAC-CellGroupConfig includes configuration information required to configure MAC parameters for a cell group. MAC-CellGroupConfig may also include DRX configuration information. For example, MAC-CellGroupConfig may include the following information in defining DRX.

- Value of drx-OnDurationTimer: defines the duration of the starting period of the DRX cycle.
- Value of drx-InactivityTimer: defines the duration of a time period during which the UE is awake after a PDCCH occasion in which a PDCCH indicating initial UL or DL data has been detected
- Value of drx-HARQ-RTT-TimerDL: defines the duration of a maximum time period until a DL retransmission is received after reception of a DL initial transmission.
- Value of drx-HARQ-RTT-TimerDL: defines the duration of a maximum time period until a grant for a UL retransmission is received after reception of a grant for a UL initial transmission.
- drx-LongCycleStartOffset: defines the duration and starting time of a DRX cycle.
- drx-ShortCycle (optional): defines the duration of a short DRX cycle.

When any of drx-OnDurationTimer, drx-InactivityTimer, drx-HARQ-RTT-TimerDL, and drx-HARQ-RTT-TimerDL is running, the UE performs PDCCH monitoring in each PDCCH occasion, staying in the awake state.

What is claimed is:

1. A method of transmitting and receiving signals by a user equipment (UE) in a wireless communication system, the method comprising:
   transmitting information on a paging capability of the UE to a base station;

receiving downlink control information (DCI) including either or both scheduling information on a first physical downlink shared channel (PDSCH) and scheduling information on a second PDSCH based on the paging capability;

receiving the first PDSCH for paging based on the DCI; and receiving the second PDSCH for paging based on the DCI based on the DCI including the scheduling information on the second PDSCH, wherein a first bit field of the DCI includes the scheduling information for transmission of the first PDSCH, and wherein a second bit field of the DCI includes the scheduling information for transmission of the second PDSCH.

2. The method of claim 1, wherein the DCI includes an indicator indicating whether a first transport block (TB) included in the first PDSCH is different from a second TB included in the second PDSCH.

3. The method of claim 2, further comprising obtaining, by the UE, a paging message by performing soft combining and decoding on the first TB and the second TB based on the indicator indicating that the first TB is equal to the second TB.

4. The method of claim 2, further comprising obtaining a paging message by decoding the second TB based on the indicator indicating that the first TB is different from the second TB.

5. The method of claim 1, wherein the scheduling information for the transmission of the second PDSCH includes at least one of an identifier (ID) of a bandwidth part (BWP) in which the second PDSCH is transmitted, a frequency hopping pattern for the transmission of the second PDSCH, or information on allocation of resources on which the second PDSCH is transmitted.

6. The method of claim 5, wherein the resource allocation information on the second PDSCH transmission includes either or both frequency resources of the second PDSCH and a time gap between the second PDSCH and the DCI.

7. The method of claim 6, wherein the reception of the second PDSCH is skipped based on the time gap between the second PDSCH and the DCI equal to 0.

8. The method of claim 5, wherein the second PDSCH is received in the BWP indicated by the ID of the BWP.

9. The method of claim 1, wherein the information on the paging capability includes information on a type of UE to receive the second PDSCH and information on specific UEs to receive the second PDSCH.

10. The method of claim 9, wherein the type of UE to receive the second PDSCH includes a UE having reduced capabilities and incapable of supporting some or all of conventional UE capabilities or a UE requiring cell coverage enhancement.

11. A nonvolatile computer-readable medium having recorded thereon a program code for executing the method defined in claim 1.

12. A user equipment (UE) operating in a wireless communication system, the UE comprising:

a transceiver; and one or more processors connected to the transceiver, wherein the transceiver is configured to:

transmit information on a paging capability of the UE to a base station;

receive downlink control information (DCI) including either or both scheduling information on a first physical downlink shared channel (PDSCH) and scheduling information on a second PDSCH based on the paging capability;

receive the first PDSCH for paging based on the DCI; and receive the second PDSCH for paging based on the DCI based on the DCI including the scheduling information on the second PDSCH, wherein a first bit field of the DCI includes the scheduling information for transmission of the first PDSCH, and wherein a second bit field of the DCI includes the scheduling information for transmission of the second PDSCH.

13. The UE of claim 12, wherein the DCI includes an indicator indicating whether a first transport block (TB) included in the first PDSCH is different from a second TB included in the second PDSCH.

14. The UE of claim 12, wherein the one or more processors are configured to obtain a paging message by performing soft combining and decoding on the first TB and the second TB based on the indicator indicating that the first TB is equal to the second TB.

15. The UE of claim 12, wherein the scheduling information for the transmission of the second PDSCH includes at least one of an identifier (ID) of a bandwidth part (BWP) in which the second PDSCH is transmitted, a frequency hopping pattern for the transmission of the second PDSCH, or information on allocation of resources on which the second PDSCH is transmitted.

* * * * *